US 6,727,973 B2

(12) United States Patent
Mizumo

(10) Patent No.: US 6,727,973 B2
(45) Date of Patent: Apr. 27, 2004

(54) NETWORK PHOTO-PRINT SERVICE SYSTEM, CENTER SERVER AND INFORMATION PROCESSING METHOD

(75) Inventor: Yoshiyuki Mizumo, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 74 days.

(21) Appl. No.: 09/798,818

(22) Filed: Mar. 2, 2001

(65) Prior Publication Data
US 2001/0021311 A1 Sep. 13, 2001

(30) Foreign Application Priority Data

Mar. 3, 2000 (JP) .................................... 2000-058874
Mar. 9, 2000 (JP) .................................... 2000-064706

(51) Int. Cl.$^7$ ............................................. G03B 27/52
(52) U.S. Cl. ......................... 355/40; 396/429; 348/96; 705/26
(58) Field of Search ......................... 396/429; 355/40, 355/77; 358/506, 527; 348/96, 211.3, 552; 705/26, 27

(56) References Cited

U.S. PATENT DOCUMENTS

| 5,649,260 A | | 7/1997 | Wheeler et al. ............ 396/569 |
| 5,666,215 A | * | 9/1997 | Fredlund et al. ............ 358/487 |
| 5,784,461 A | * | 7/1998 | Shaffer et al. ............... 355/18 |
| 5,949,551 A | * | 9/1999 | Miller et al. ............ 348/211.3 |
| 5,974,401 A | * | 10/1999 | Enomoto et al. ............ 355/40 |
| 6,017,157 A | * | 1/2000 | Garfinkle et al. ............ 355/40 |
| 6,133,985 A | * | 10/2000 | Garfinkle et al. ............ 355/40 |
| 6,157,436 A | * | 12/2000 | Cok ............................ 355/40 |
| 6,169,596 B1 | * | 1/2001 | Shiota ......................... 355/40 |

FOREIGN PATENT DOCUMENTS

| EP | 856972 A2 | * | 8/1998 | ........... H04L/29/06 |
| JP | 10-214284 A | | 8/1998 | |
| JP | 11-154218 A | | 6/1999 | |

* cited by examiner

Primary Examiner—David M. Gray
(74) Attorney, Agent, or Firm—Sidley Austin Brown & Wood LLP

(57) ABSTRACT

A center server in a network photo-print service system receives print order information related to a print, order and information related to conditions for a delivery site for prints, outputted in response to the order, from the customer (a customer-side terminal) through the network, extracts a delivery shop candidate group suitable for the conditions for a delivery site for prints from the shops capable of delivering the prints, requests the customer to select a shop from the delivery shop candidate group as a delivery shop, that is, a delivery site for the prints, and transmits the print order information to a print output device placed in the delivery shop thus determined in accordance with the selection by the customer. Moreover, the transmission end of the print order information is altered depending on whether the printing process in the print order information is, for example, (1) a printing process having a size not more than a predetermined size (first printing process) or (2) a printing process having a size greater than the predetermined size (second printing process).

19 Claims, 26 Drawing Sheets

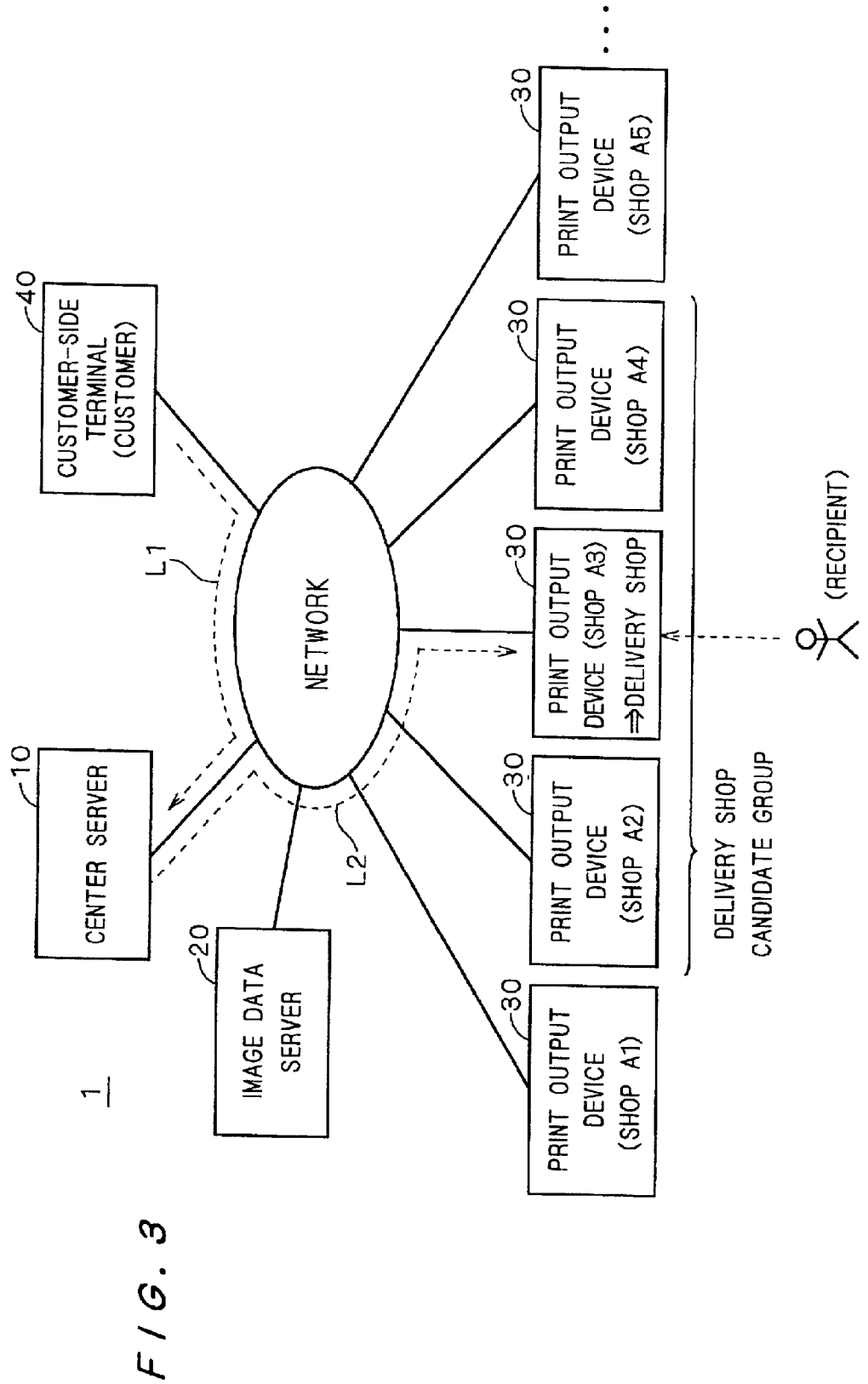
F I G. 3

FIG. 4

<PRINT ORDER INFORMATION>

| RECEIPT NUMBER |
| --- |
| CUSTOMER IDENTIFICATION DATA |
| IMAGE DATA 1 |
| PROCESS CONTENTS 1 (SIZE, NUMBER OF SHEETS) |
| IMAGE DATA 2 |
| PROCESS CONTENTS 2 (SIZE, NUMBER OF SHEETS) |
| ⋮ |

FIG. 8A

```
SELECTION OF MENU

1. ORDER FOR PRINTS
2. CONFIRM ORDER CONTENTS
3. CONFIRM PRINT STATE
4. ALTER REGISTERED DATA

NUMBER → [    ] [OK]
```
~P2

FIG. 8B

INPUT PRINT PROCESS CONTENTS
(NUMBER OF PRINTS)
(PRINT SIZE: L SIZE (SERVICE SIZE))

1. [img] [  ] SHEETS    4. [img] [  ] SHEETS
2. [img] [  ] SHEETS    5. [img] [  ] SHEETS
3. [img] [  ] SHEETS    6. [img] [  ] SHEETS

```
SELECTION OF MENU

1. ORDER FOR PRINTS
2. CONFIRM ORDER CONTENTS
3. CONFIRM PRINT STATE
4. ALTER REGISTERED DATA

NUMBER → [    ] [OK]
```

FIG. 20B

```
         INPUT PRINT PROCESS CONTENTS
         (PRINT SIZE AND NUMBER OF PRINTS)

[img] a.SERVICE SIZE [ ]SHEETS      [img] a.SERVICE SIZE [ ]SHEETS
  1.       b.OCTAVO  SIZE [ ]SHEETS   4.       b.OCTAVO  SIZE [ ]SHEETS
           c.QUARTO  SIZE [ ]SHEETS            c.QUARTO  SIZE [ ]SHEETS

[img] a.SERVICE SIZE [ ]SHEETS      [img] a.SERVICE SIZE [ ]SHEETS
  2.       b.OCTAVO  SIZE [ ]SHEETS   5.       b.OCTAVO  SIZE [ ]SHEETS
           c.QUARTO  SIZE [ ]SHEETS            c.QUARTO  SIZE [ ]SHEETS

[img] a.SERVICE SIZE [ ]SHEETS      [img] a.SERVICE SIZE [ ]SHEETS
  3.       b.OCTAVO  SIZE [ ]SHEETS   6.       b.OCTAVO  SIZE [ ]SHEETS
           c.QUARTO  SIZE [ ]SHEETS            c.QUARTO  SIZE [ ]SHEETS

[OK]
```

F I G . 2 1

```
                                                         ┌─P103
┌─────────────────────────────────────────────────────────┐
│                                                         │
│                                                         │
│           SELECT PRINT DELIVERY METHOD                  │
│                                                         │
│              1. HOME DELIVERY                           │
│              2. SPECIFIED DELIVERY SHOP                 │
│                                                         │
│                                                         │
│                              NUMBER → [    ] [OK]       │
│                                                         │
└─────────────────────────────────────────────────────────┘
```

FIG. 25

|  | DELIVERY AT SHOP | HOME DELIVERY |
|---|---|---|
| FIRST PRINTING PROCESS | I | III |
| SECOND PRINTING PROCESS | II | IV |

I : PRINT BY FIRST PRINT OUTPUT DEVICE
II~IV : PRINT BY SECOND PRINT OUTPUT DEVICE

FIG. 26

INPUT TELEPHONE NUMBER OF
DESIRED PRINT DELIVERY SITE

<PRINT ORDER INFORMATION>

| RECEIPT NUMBER |
| --- |
| CUSTOMER IDENTIFICATION DATA |
| IMAGE SPECIFYING DATA 1 |
| PROCESS CONTENTS 1 (SIZE, NUMBER OF SHEETS) |
| IMAGE SPECIFYING DATA 2 |
| PROCESS CONTENTS 2 (SIZE, NUMBER OF SHEETS) |
| ⋮ |

FIG. 28

SELECT PRINT DELIVERY METHOD

1. HOME DELIVERY
2. SPECIFIED DELIVERY SHOP A (CONVENI. ETC.)
3. SPECIFIED DELIVERY SHOP B( LABO. ETC.)
   (→ DELIVERY IS MADE EARLIER THAN 2)

NUMBER→ [ ] [OK]

P110

NETWORK PHOTO-PRINT SERVICE SYSTEM, CENTER SERVER AND INFORMATION PROCESSING METHOD

This application is based on application Nos. 2000-058874 and 2000-064706 filed in Japan, the contents of which are hereby incorporated by reference.

BACKGROUND OF THE INVENTION

1. Field of the Invention

The present invention relates to a network photo-print service system which takes orders for photo-prints from customers through a network and carries out print output services in accordance with the orders.

2. Description of the Background Art

A network photo-print service system, which takes orders for photo-prints from customers through a network and carries out print output services in accordance with the orders, has been proposed.

Such a network photo-print service system has advantages in that it is possible to take orders through a network and that customers need not go to a store to place orders.

However, with respect to receiving processes of prints that are outputted in accordance with the orders, those processes fail to sufficiently meet the various demands from the customers and tend to be inefficient.

Moreover, with respect to the contents of printing processes in the photo-prints, various kinds of processes, such as a normal-size process, a process having a size larger than the normal-size or a process accompanying a special digital image processing, has been carried out.

However, since a general purpose print output device capable of executing all kinds of printing processes is expensive, it would raise a problem of costs, etc., to distribute such general purpose devices to many shops as the print output devices for executing the above-mentioned printing processes.

Moreover, with respect to the contents of orders, for example, an actual situation is that orders for normal-size prints account for a considerable rate, while orders for the other-size prints are very few; therefore, it has been demanded to construct an efficient system that meets such an actual situation.

SUMMARY OF THE INVENTION

In accordance with the first aspect of the present invention, a center server, which is used in a network photo-print service system that takes an order for photo-prints from a customer through the network and provides a print output service in response to the order, is provided with a receiver for receiving print order information related to a print order and information related to conditions for a delivery site for prints, outputted in response to the order from the customer through the network; a memory for storing information of a plurality of shops capable of delivering the prints; a selector for extracting a delivery-shop candidate group suitable for the conditions for a delivery site for prints from the plurality of shops capable of delivering the prints based upon the information stored in the memory; a transmitter for transmitting information related to the delivery-shop candidate group extracted by the selector to the customer; and a controller which, in response to selection by the customer, determines a suitable delivery shop from the delivery-shop candidate group and transmits the print order information to a print output device placed in the delivery shop thus determined.

With this arrangement, the customer can readily receive ordered prints at a delivery shop that the customer has determined in accordance with his or her needs; thus, it is possible to provide a convenient service.

In accordance with a second aspect of the present invention, the center server has an arrangement in which the print order information has image data that is a subject for the print output process, data related to the contents of the print output process and customer identification data for identifying the customer. Here, the center server also has an arrangement in which the print order information has image specifying data for specifying image data stored in a predetermined server as a subject image for the print output process, data related to the contents of the print output process and customer identification data for identifying the customer.

Since the above-mentioned print order information includes customer identification data, it is possible to improve reliability in the transaction.

In accordance with a third aspect of the present invention, the center server has an arrangement in which the print order information includes at least data related to the contents of the printing process, the center server further includes a judging section for judging whether the printing process relates to a first printing process that is outputted by a first print output device or a second printing process that is outputted by a second print output device; and the controller, in the case when the judgment by the judging section shows that the printing process is the first printing process, transmits the print order information to the first print output device, and in the case when the judgment by the judging section shows that the printing process is the second printing process, transmits the print order information to the second print output device.

With this arrangement, when it is judged that the contents of a printing process relate to the first printing process, the print order information is sent to the first print output device, and when it is judged that the contents of a printing process relate to the second printing process, the print order information is sent to the second print output device; therefore, after having been properly delivered to the first print output device and the second print output device depending on the contents of printing processes, the corresponding printing processes are carried out. Consequently, it is possible to construct a system which can efficiently deal with a printing process in accordance with its contents In accordance with the fourth aspect of the present invention, the center server has an arrangement in which the first print output device is placed in a delivery shop that the customer is allowed to specify as the print delivery site, and the controller transmits the print order information to the first print output device placed in the delivery shop specified by the customer as the print delivery site.

With this arrangement when it is judged that the contents of a printing process relate to the first printing process, the print order information is sent to the first print output device that is placed at a delivery shop that has been specified by the customer as a print receiving place; therefore, the customer can readily receive the resulting print outputted by the first print output device at the delivery shop specified by the customer, making the system more convenient.

In accordance with the fifth aspect of the present invention, the center server has an arrangement in which the second print output device is placed in a non-delivery store that the customer is not allowed to specify as the print delivery site, and the controller transmits the print order information to the second print output device placed in the non-delivery shop.

With this arrangement, when it is judged that the contents of a print process relate to the second print process, the print order information and information relate to the delivery shop are sent to the second print output device placed in a non-delivery shop; thereafter, the resulting print outputted from the second print output device therein is transferred to the delivery shop, thereby allowing the customer to receive the corresponding print at the delivery shop.

The first objective of the present invention is to provide a network photo-print service system capable of achieving convenient services so as to meet the customers' demands, and related techniques for such a system.

Moreover, the second objective of the present invention is to provide an efficient network photo-print service system which can be constructed at low costs and related techniques for such a system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a conceptual drawing that shows a flow of data, etc. in a system 1.

FIG. 4 is a drawing that shows the contents of print order information.

FIG. 8A is a drawing that shows a menu screen P2, and FIG. 8B is a drawing that shows an input screen P10 for the contents of a process.

FIG. 20A is a drawing that shows a menu screen P102, and FIG. 20B is a drawing that shows an input screen P111 for the contents of a process.

FIG. 21 is a drawing that shows a menu screen P103 for a receiving method.

FIG. 22 is a drawing that shows screens P104, P105 and P106a.

FIG. 25 is a drawing that shows a print output end in accordance with a kind of print process and a print receiving method.

FIG. 26 is a drawing that shows a screen P9 calling for an input of a telephone number.

FIG. 27 is a drawing that shows a modified example of the contents of print order information.

FIG. 28 is a drawing that shows a menu screen P110 for a receiving method.

DESCRIPTION OF THE PREFERRED EMBODIMENTS

Referring to the Figures, the following description will discuss preferred embodiments of the present invention in detail.

1. First Preferred Embodiment

<A. Constitution>

<Outline>

Figure 1:
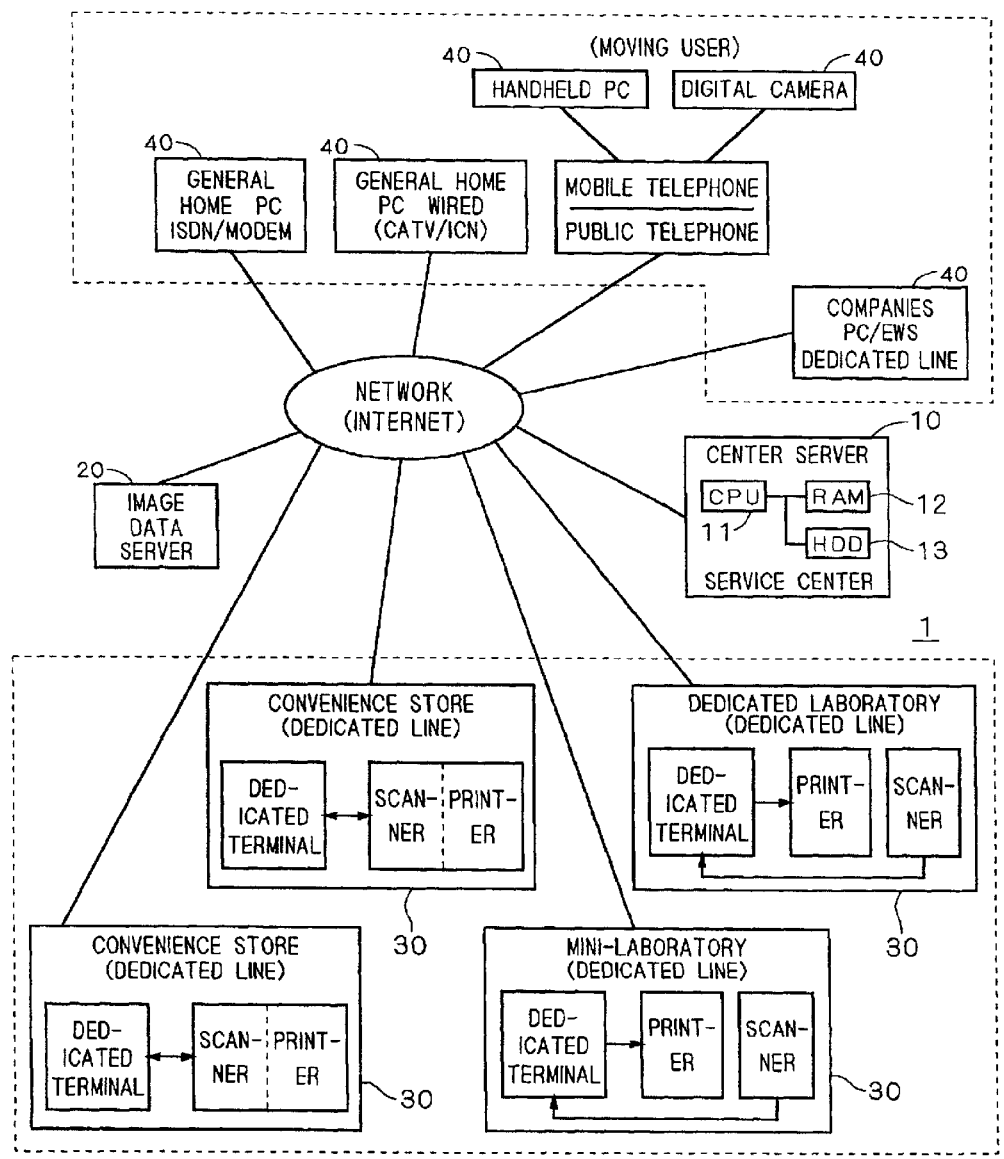
FIG. 1 is a drawing that shows a conceptual structure of a network photo-print service system 1 in accordance with a first preferred embodiment of the present invention.

FIG. 1 is a drawing that shows a conceptual structure of a network photo-print service system 1 in accordance with the first preferred embodiment of the present invention. This network photo-print service system 1 takes orders for photo-prints from customers through a network and executes print output services in response to the orders.

As illustrated in FIG. 1, this system 1 is provided with a center server 10 for taking orders from customers and a print output device 30 for executing print output processes in response to the orders.

As will be described later, the center server 10 takes orders for photo-prints through a network and also obtains necessary information from a customer, allowing the center server 10 to send print order information to the corresponding print output device 30. For example, the center server 10 is placed in a service center, etc., of a company that provides the photo-print services.

Moreover, the print output device 30 executes a print output process in response to print order information from a customer that has been received from the center server. The print output device 30 is placed in each of a plurality of shops that can receive and deliver prints. For example, these shops may include various laboratories (mini-laboratories capable of carrying out basic output processes or exclusive laboratories capable of carrying out high-degree treatment processes), as well as convenience stores, general stores, supermarkets, etc. The print output device 30, which is a device capable of outputting transferred image data with high quality, is provided as a single printer device separated from a scanner and also provided as a system that is integrally constituted by a scanner and a printer. Alternatively, the print output device 30 may be provided as a system which is constituted by combining a printer and a computer having a communication function, provided as a device separated from the printer.

The center server 10 and print output devices 30 are connected to a network, and allowed to transmit and receive data to and from each other.

Here, the "network" refers to a communication line network for executing data transfer and, more specifically, various communication line networks, constituted by electric communication lines (including optical communication lines), such as the Internet, LAN, WAN, CATV and ICN (Inter-Community Network). The connecting method to the network may be either a regular connection using a dedicated line, etc., or a temporary connection, such as a dial-up connection utilizing telephone lines like analog lines or digital lines (ISDN). Moreover, its transfer method may be a radio method or a cable method.

Customers can connect to the network through customer-side terminals 40. With respect to the customer-side terminals 40, examples thereof include: personal computers placed in homes, offices, and other places, mobile computers that are portable and digital cameras having communication functions. These customer-side terminals 40 can be connected to the network through dial-up connection, etc. Thus, through the network, accesses are made to an information receiving portion 15 (which will be explained later, see FIG. 2) having a functional construction in the center server 10 so that the above-mentioned photo-print requests are received.

An image data server (image pool server) 20 is connected to the network in a separated manner from the center server 10. With respect to the image data server 20, for example, the following system is assumed; a customer preliminarily has another contract with a supplier of an image data server 20 in a separate manner so that an area having a predetermined capacity is allocated to the customer as a storage area for image data. The customer is allowed to store image data in the image data server 20. Here, in the present system 1, the image data server 20 is not necessarily provided, and it is possible to constitute the present system 1 by using the center server 10 and the print output device 30.

<Center Server 10>

Figure 2:
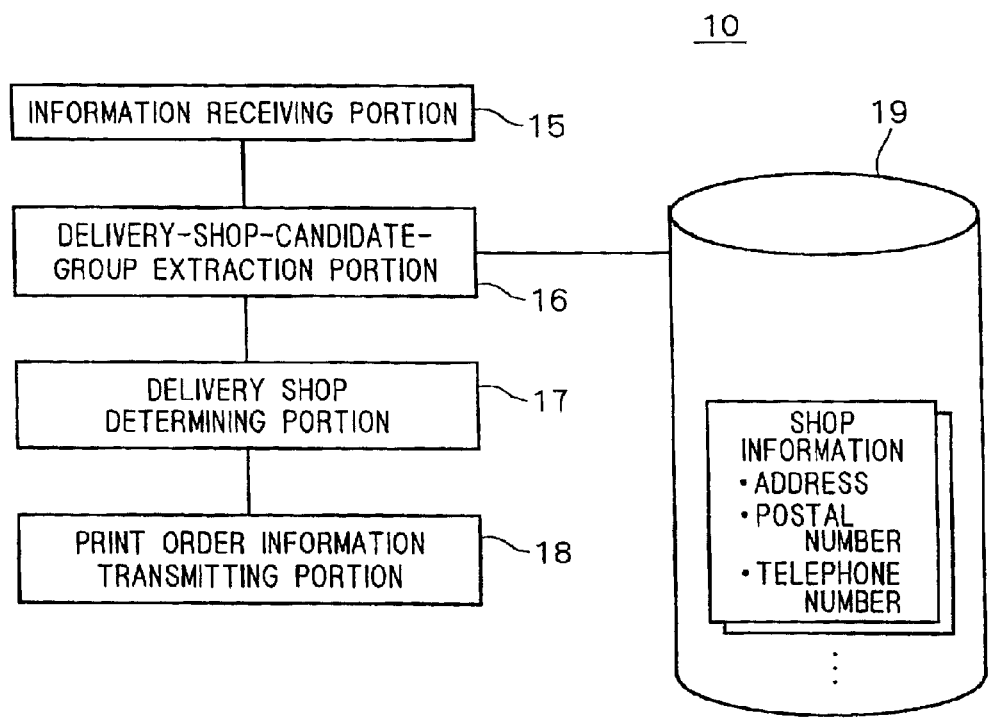
FIG. 2 is a block diagram showing a center server 10.

As illustrated in FIG. 1, with respect to hardware, the center server 10 is arranged as a computer system (hereinafter, also referred to simply as "computer") constituted by a CPU 11, a main storage section 12 provided with a semiconductor memory such as a RAM (and/or a ROM), and an auxiliary storage section 13 such as a hard disk drive (HDD). Here, such a computer executes a predetermined program so that various functions as the center server 10, which will be explained next, are exerted. Referring to FIGS. 2 and 3, an explanation will be given of these functions. FIG. 2 is a block diagram showing the center server 10, and FIG. 3 is a conceptual drawing that shows a data flow in the present system 1.

As illustrated in FIG. 2, the center server 10 is provided with functional portions such as an information receiving portion 15, a delivery-shop-candidate-group extraction portion 16, a delivery shop determining portion 17, a print order information transmitting portion 18 and shop information storage portion 19.

Among these portions, the information receiving portion 15 receives "print order information" relating to an order for prints and "information concerning conditions related to a delivery site for prints" outputted in accordance with the order from a customer through the network. In other words, as illustrated in FIG. 3, the customer makes an access to the center server 10 through the network by means of a customer-side terminal 40 and inputs the above-mentioned pieces of information so that operations for print orders, etc. are carried out. These operations are indicated by a broken line L1 in FIG. 3, and in this manner, the center server 10 receives the "print order information" and "information concerning conditions related to a delivery site for prints."

Here, the "print order information" (see FIG. 4) contains "receipt number" added to the order in accordance with predetermined rules such as ordering time, "image data" that is a subject of the print output process, data related to the contents of the print output process (for example, "print size" (size) and "the number of prints"), and "customer identification data" (for example, member's number and pass number) for identifying customers. Moreover, "conditions related to a delivery site for prints" (hereinafter, referred to as "conditions for delivery site") shows conditions given by the customer upon deciding the print delivery site. Such conditions include, for example, identification information related to a desired print deliver) site (postal number, telephone number).

The delivery-shop-candidate-group extraction portion 16 (see FIG. 2) extracts a delivery shop candidate group suitable for "conditions for delivery site" from a plurality of shops capable of delivery of the prints. This extraction process is carried out based upon shop information (address, postal number, telephone number) related to a plurality of shops stored in the shop information storage portion 19 and information related to conditions for print delivery site given by the customer. More specifically, by utilizing the fact that postal numbers have a hierarchical arrangement related to districts, for example, among seven digits of the postal number, those shops having postal numbers with upper five coincided digits may be extracted as a delivery shop candidate group. Alternatively, in order to improve the extraction precision at adjacent areas such as prefecture borders and city borders, at least one postal number to be extracted is preliminarily determined with respect to postal numbers, and those shops having at least the corresponding postal number may be extracted as a delivery shop candidate group.

FIG. 3 shows a case in which, among a plurality of shops Ai (i=1, . . . N: N is the number of shops capable of delivery and registered in the center server 10), three shops A2, A3 and A4 are extracted as a delivery shop candidate group suitable for the "conditions for delivery site".

Moreover, the delivery shop determining portion 17 (see FIG. 2) calls for the customer to select one of the shops from the delivery-shop candidate group as the print delivery site and determines the delivery site in accordance with the selection of the customer. For example, the customer is provided with information, including a list of delivery shops contained in the delivery shop candidate groups, and the customer is allowed to select a desired one of them in accordance with his or her needs and determine the print delivery site by receiving the information.

Moreover, the print order information transmitting portion 18 transmits the print order information to a print output device placed in the delivers shop selected by the customer as the print delivery site. This operation is indicated by a broken line L2 in FIG. 3, and the print order information is sent to the shop A3 selected as the delivery shop by the delivery shop determining portion 17.

Thus, the customer can receive the ordered prints at the delivery shop (shop A3) that has been selected as the delivery site. Now, it should be noted that, in this description, the word "delivery" means "handing over" in addition to "distributing".

Here, an explanation has been given of a case in which the person who receives the prints (recipient) is the same person that has ordered the prints (customer): however, the present invention is not intended to be limited by this and the present invention can be applied to a case in which the prints are received by a person other than the customer such as a friend or an acquaintance of the customer. In this case, with respect to the above-mentioned "conditions for print delivery site", the above-mentioned condition for the delivery site at which the friend, or the acquaintance, etc. will receive the prints is added thereto. In other words, the customer gives a postal number (telephone number, etc.) of a desired recipient and its desired delivery site to the information receiving portion 15 of the center server 10 as the above-mentioned conditions; thus, in the same manner as described above, the delivery-shop-candidate-group extraction portion 16 extracts a delivery shop candidate group, the delivery shop determining portion 17 determines the delivery shop, and the print order information transmitting portion 18 transmits the print order information to the print output device placed in the delivery shop. Thus, after the recipient (the friend or acquaintance of the customer) has been informed by the customer of the delivery in a separate manner, the recipient can obtain the prints at the delivery shop selected by the customer.

<B. Operation>

Figure 5:
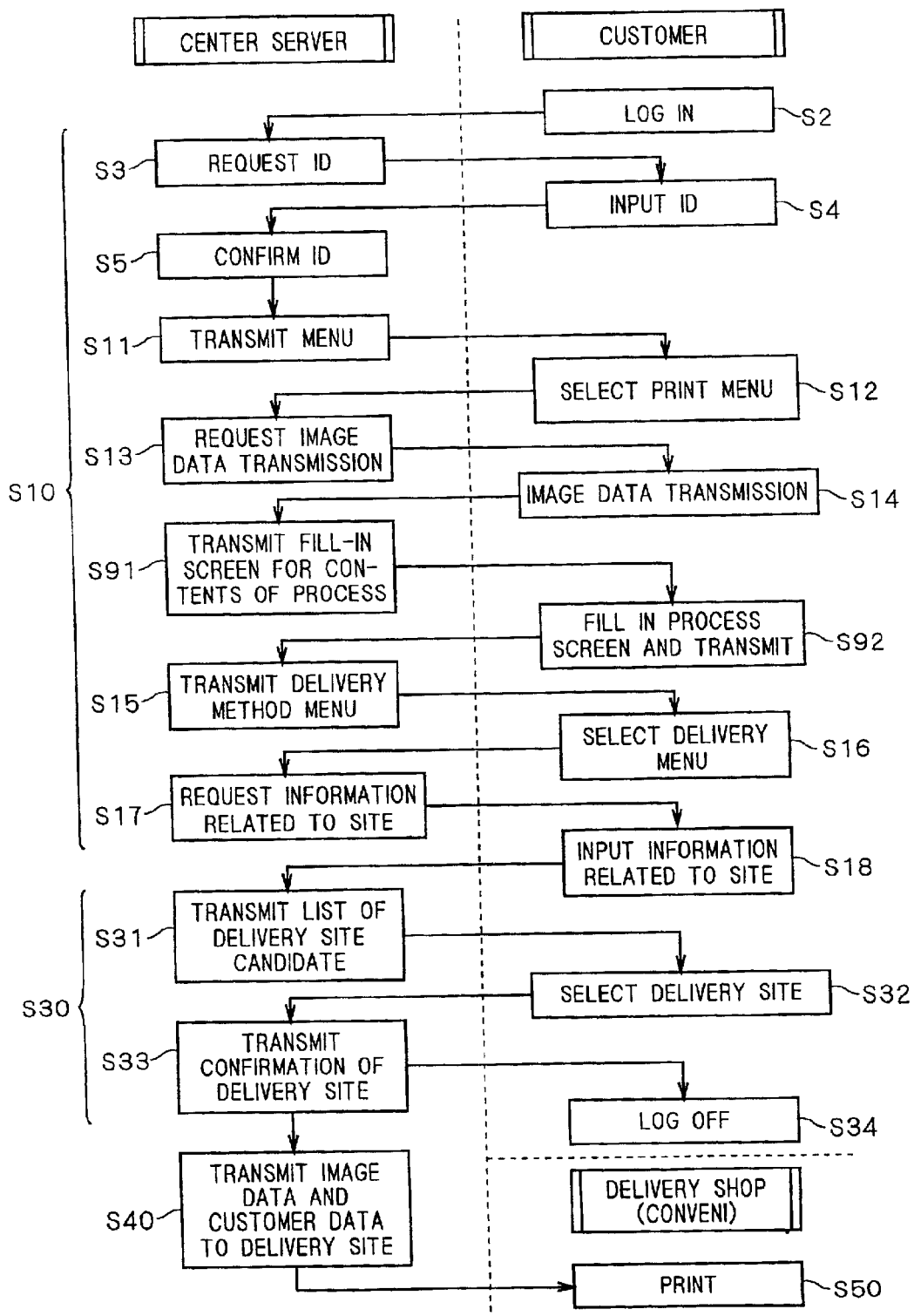
FIG. 5 is a flow chart that schematically shows the operation in the system 1.
Figure 6:
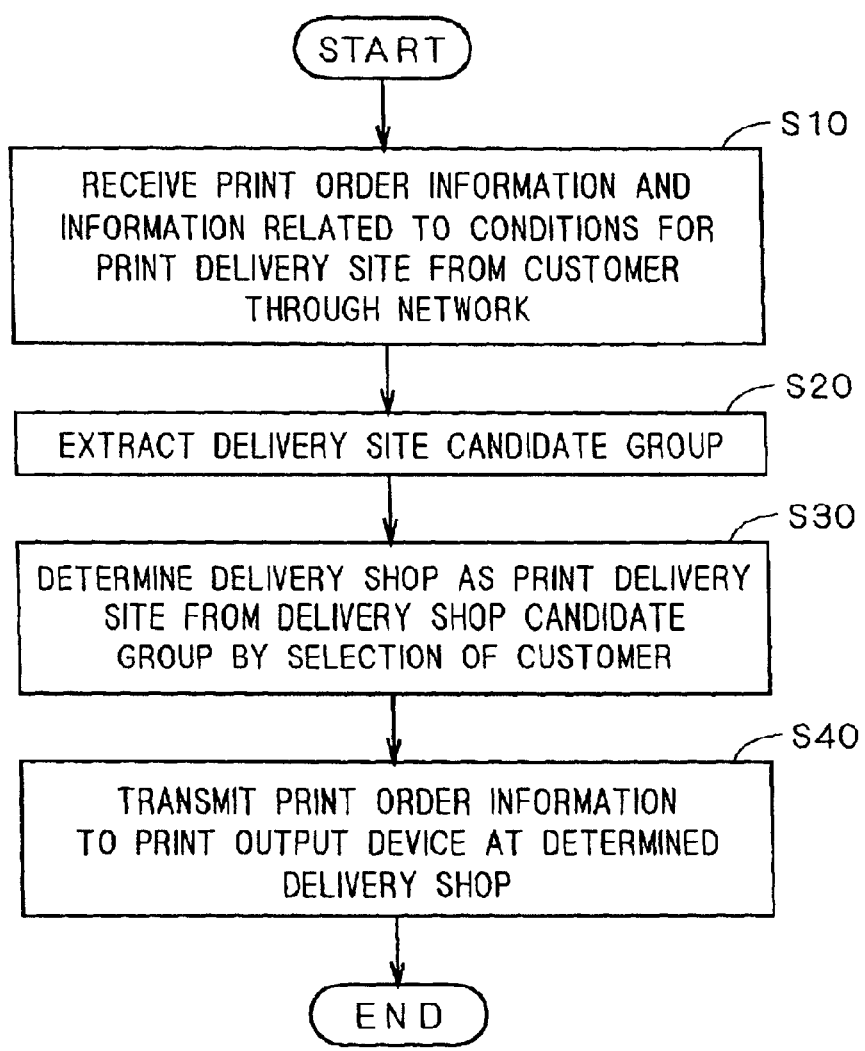
FIG. 6 is a flow chart that shows the operation in a center server 10.

Next, a detailed explanation will be given of the operation of the present system 1. FIGS. 5 and 6 are flow charts that schematically show the operations of the present system 1. FIG. 5 explains the respective operations in the center server 10, the print output device 30 and the customer-side terminal 40, mainly with respect to their communication operations, and FIG. 6 mainly explains the operation of the center server 10 among these.

Figure 7:
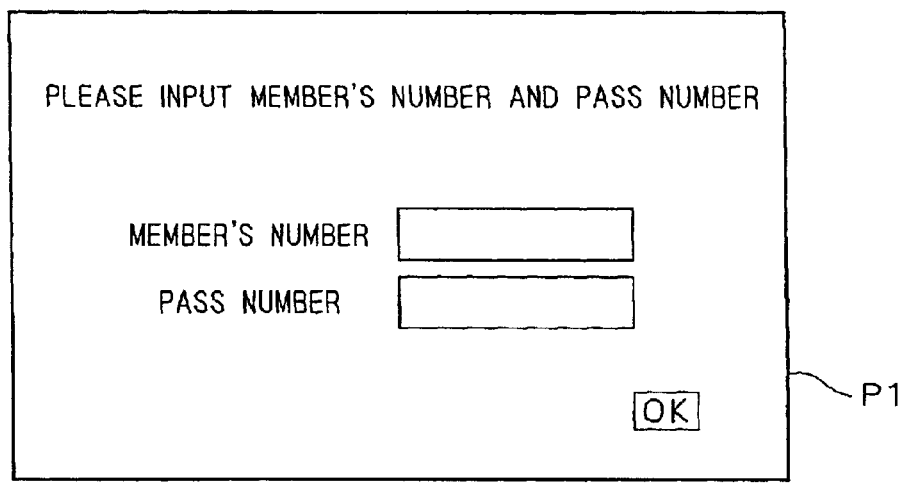
FIG. 7 is a drawing that shows a log-in menu screen P1.

First, as illustrated in FIG. 5, at step S2, the customer makes an access to the center server 10 and tries to log in. More specifically the customer has a home page such as "print order taking service" displayed on the monitor of the customer-side terminal 40 through the WWW browser, and the log-in is made by pressing "a print service taking button", etc., contained in the home page. In response to the pressing down, etc., of the taking button, the center server 10 requests the customer to input the customer identification data (ID data) (step S3), and the customer then inputs his or her own customer identification data (step S4). FIG. 7 is a drawing that shows one example of this log-in menu. The screen P1 of FIG. 7 exemplifies a case in which a member's number and its corresponding pass number are requested as the customer identification data, and the customer inputs his or her member number and the pass number.

Here, this operation has been explained on the assumption that the customer has already owned his or her customer identification data. The customer identification data is issued by the center server 10, etc. when a member registration has been made. The operation for this purpose is carried out through another member registration screen, etc. In the case where the customer has not been registered, after obtaining the customer identification data through the member registration screen, the customer can again return to the screen P1 of FIG. 7 and carry out the corresponding operation. This confirmation process through such customer identification data makes it possible to improve reliability in the transaction. Moreover, since the identification of the customer is available, various modifications can be made, that is, for example, upon receiving the payment for the prints, in addition to payment in cash at the print delivery shop, the bill may be directly drawn from the customer's bank account.

In FIG. 7, when the customer inputs his or her member number and pass number, the center server 10 confirms whether or not the inputted customer identification data is correct (step S5). If not correct, the request for the input is again made, and if it is correct, the sequence proceeds to the next operation.

At step S11, the center server 10 transmits a menu to the customer-side terminal 40. FIG. 8A is a drawing that shows one example of this menu screen P2. In the screen P2, the display contains four selections. That is. "1. print order" is a selection menu for placing an order (request) for prints, and "2. confirmation for the contents of the order" is a selection menu for confirming the contents of the previous order. Moreover, "3. confirmation for the state of the print" is a selection menu for confirming whether the prints thus ordered can be delivered or not (have been printed or not), and "4. alteration of registered data" is a selection menu for altering the registered data. The customer selects a desired selection menu from the selection menus displayed on the screen P2, and inputs the corresponding number (step S12). Here, this explanation is further given on the assumption that the menu, "1. print order", has been selected.

Next, at step S13, the center server 10 requests for the transmission of image data as a subject image for the print output process. In response to this, the customer sends the image data as the subject image (step S14). Thus, the center server 10 is allowed to obtain the image data.

Next, at step S91, the center server 10 transmits a process contents input screen P10 to the customer-side terminal 40. FIG. 8B is a drawing that shows one example of this screen P10. In this case, the displayed screen requests input of the number of prints for each of a plurality of image data (six, in this case) sent in the above-mentioned step S14. In response to this, the customer inputs the number of prints for each of the image data (step S92). Here, in the case when a print order is made for image data of not less than seven, even with respect to the seventh image data and thereafter, the same screen as the screen P10 is used so as to further repeat the same operations as steps S91 and S92; thus, the number of prints for each piece of image data is inputted. Moreover, this example shows a case in which it is not possible to specify the print size other than the L-size (service size).

The above-mentioned operations of S91 and S92 allow the center server 10 to obtain data related to the contents of a printing process that has been selected and inputted (the print size and the number of prints) through the network.

Figure 9:
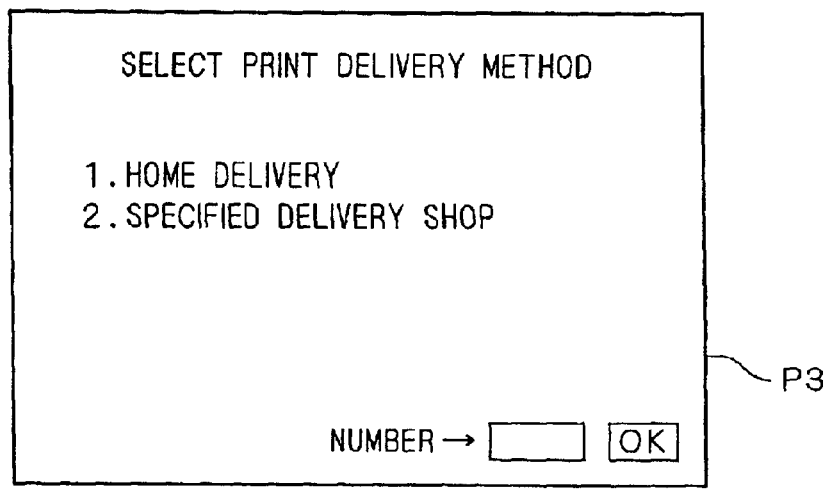
FIG. 9 is a drawing that shows a menu screen P3 for a receiving method.
Figure 10:
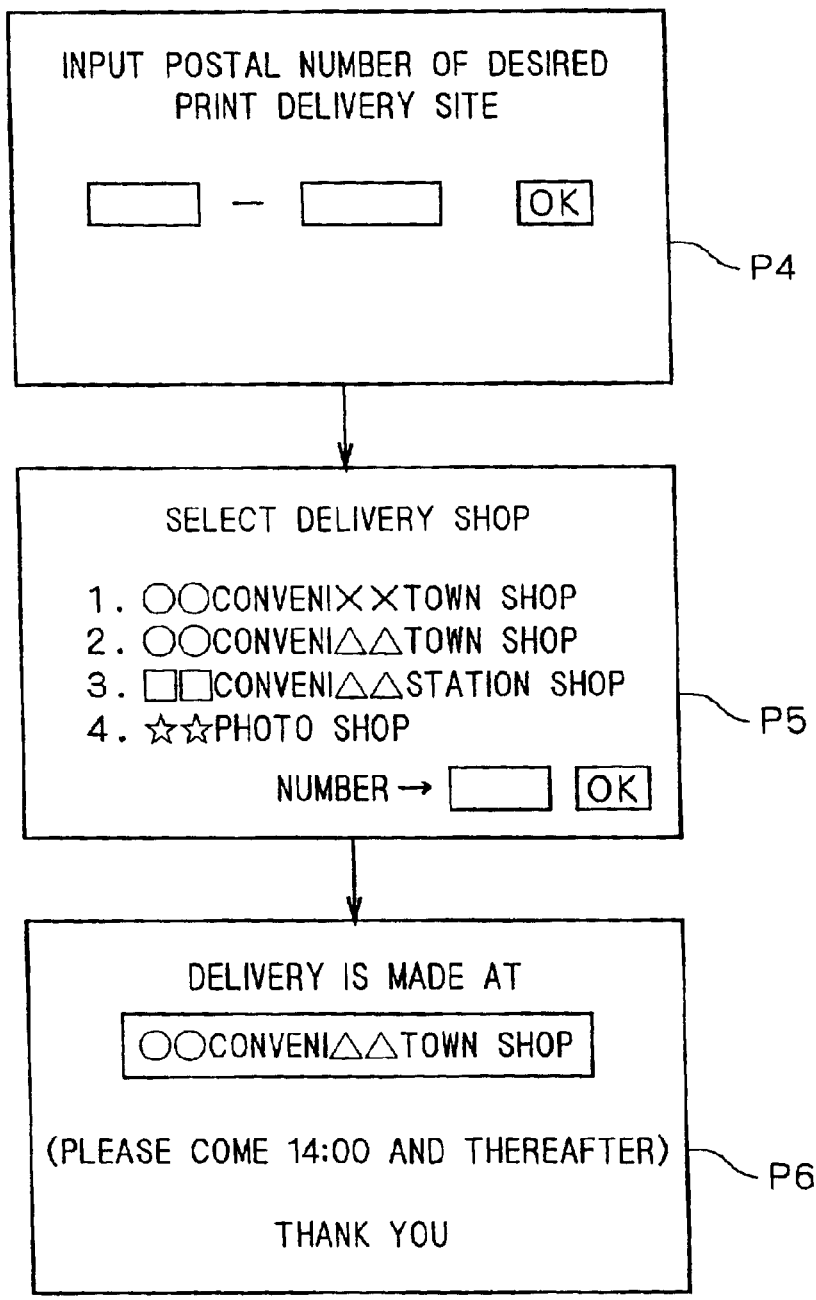
FIG. 10 is a drawing that shows screens P4, P5 and P6.

Moreover, at step 51, a menu for delivery methods is transmitted so that a request is given to the customer to make a selection of the print delivery method for the outputted prints. For example, FIG. 9 shows a screen P3 used for this purpose. Here, in response to the request, the customer selects any one of the methods. In this screen P3, an explanation will be further given of a case in which "2. specified delivery shop" is selected. FIG. 10 shows screens P4, P5 and P6 that are displayed on the customer-side terminal 40, with respect to processes to be continuously carried out after the "2. specified delivery shop" has been selected.

At step S17, the center server 10 requests the customer to print information related to the site, that is, "conditions of a delivery site." The screen P4 of FIG. 10 is a screen requesting a postal number of the desired site at which the print delivery is to be made as one of such conditions (more specifically, a postal number of the place at which the desired delivery shop is located or a postal number of an area in the vicinity thereof). When the customer wants to specify a shop (closest to) located in the vicinity of the customer's home, the recipient (customer) is allowed to input the postal number of his or her own address as one of the "conditions of a delivery site" (step S18). This arrangement allows the center server 10 to obtain information related to the "conditions of a delivery site" through the network.

Thus, as shown in step S10 of FIG. 6, the center server 10 is allowed to receive the print order information related to a print order and information related to the conditions of a delivery site outputted in accordance with the order from the customer through the network.

Next, as also illustrated in FIG. 6, at step S20, the center server 10 extracts a delivery shop candidate group suitable for the "conditions of the delivery site" among a plurality of shops capable of the print delivery. More specifically, the delivery-shop-candidate-group extraction portion 16 carries out the above-mentioned operations.

At step S30, the center server 10 requests the customer to select one of the delivery shops among the delivery shop candidate group as the print delivery site, and the print delivery site is determined in accordance with the selection of the customer. The operations in step S30 are realized by using the delivery shop determining portion 17.

More specifically, as illustrated in step S31 of FIG. 5, the center server 10 shows the delivery shop candidate group extracted as a group suitable for the above-mentioned conditions to the customer and requests the customer to select a desired delivery shop from the group.

The screen P5 of FIG. 10 shows a case in which four shops have been extracted as a group of delivery shops suitable for the "conditions of a delivery site". Here, three convenience stores (hereinafter, referred to as "convenistores") and one laboratory (photo-shop or processing laboratory) are extracted, and displayed on the screen P5 of the customer-side terminal 40. Such a screen P5 is given as a result of the request for selecting one of the shops of the delivery-shop group that has been sent from the center server 10 to the customer-side terminal 40. Here, the display of the delivery shop candidate group may be given as a mode for showing the above-mentioned screen P5 to the customer; however, there may be provided another mode in which a screen, which displays the positions of the respective shops in the delivery shop candidate group (and/or the position of the customer) on a map, is given to the customer, if necessary.

Upon receipt of the request at step S31, the customer selects one of the shops as a delivery site (step S32 of FIG. 5). In response to this selecting operation, the center server 10 is allowed to obtain information as to which shop is selected and determined as the print delivery site. Then, the received information is presented to the customer so as to confirm the shop (that is, the delivery shop) which has been determined as the delivery site (step S33). The screen P6 of FIG. 10 shows an example for this confirmation screen and, for example, this screen indicates the name of the delivery shop, and the date and time at which the delivery is available.

After confirming the information displayed on the screen P6, the customer logs off (step S34). Thus, the operation on the customer-side terminal 40 is complete.

On the center server 10 side, in the next step S40 (FIG. 5), the print order information transmitting portion 18 transmits the print order information to the print output device placed in the delivery shop selected by the customer as the print delivery site. The print order information includes "image data" that is a subject for the print output process, data (the print size and the number of prints) related to the contents of the print output process and customer identification data (member's number, etc.) for identifying the customer.

Then, upon receipt of the respective data sent (transmitted) from the center server 10, the print output device 30, placed in the delivery shop, carries out a print output operation for the image data that is the subject for the print output process in accordance with the data (the print size and the number of prints) related to the contents of the print output process. In other words, the corresponding prints, ordered by the customer through the network, are formed (step S50 in FIG. 5).

Thereafter, the recipient (in this case, the customer) goes to the selected shop (delivery shop) so as to receive the ordered prints.

As described above, in the present system 1, the order for photo-prints placed by a customer is taken through the network, and the corresponding print outputting service is carried out in accordance with the order.

Figure 11:
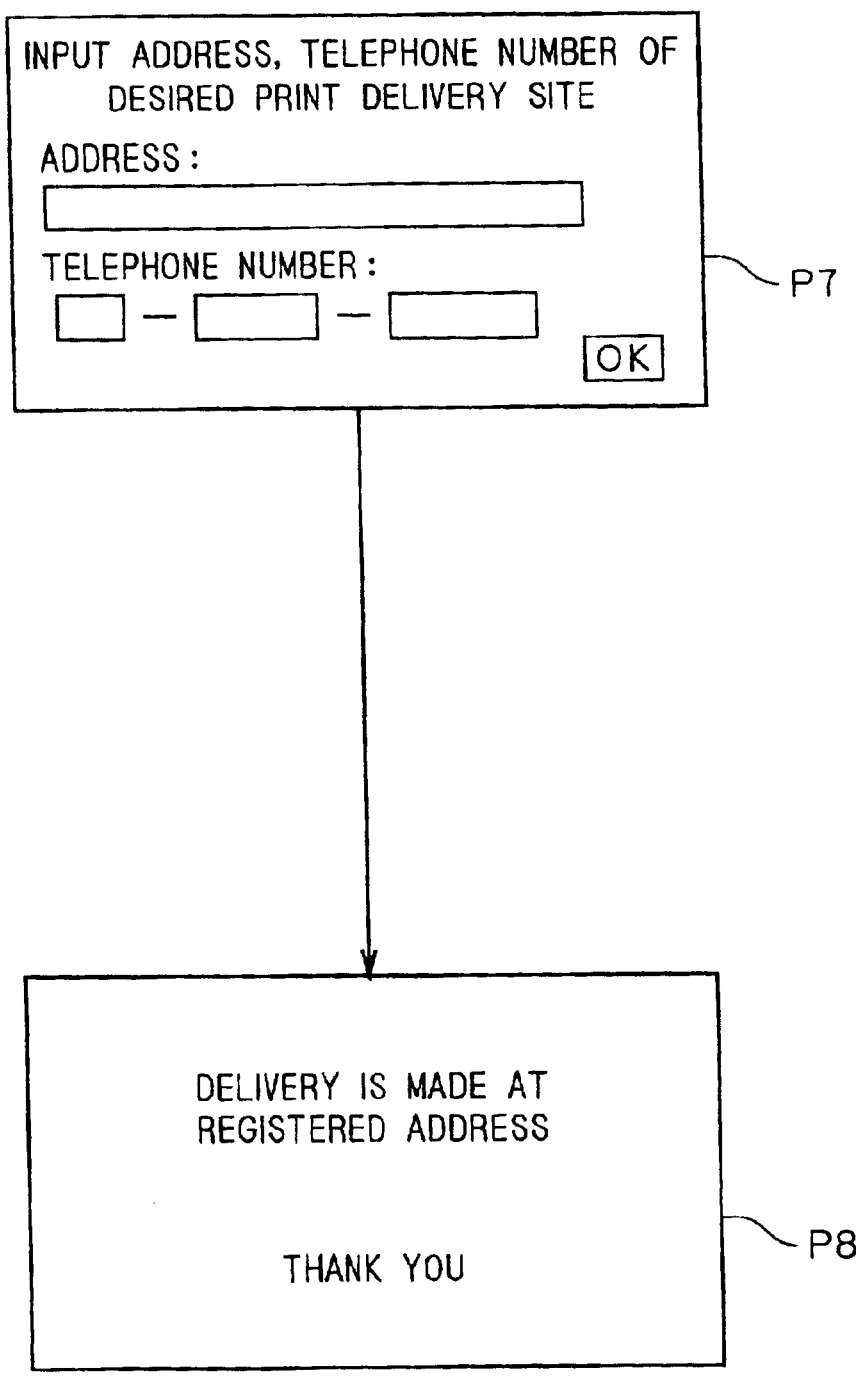
FIG. 11 is a drawing that shows screens P7 and P8.

In the above-mentioned operations, the explanation has been given of a case in which "2. specified delivery shop" has been selected in the screen P3 of FIG. 9 (steps S15 and S16 in FIG. 5); in contrast, in the case when "1. home delivery" has been selected, the sequence proceeds to the screen P7 of FIG. 11 at which the destination of delivery is registered by inputting the address and telephone number of the destination of delivery. Then, the center server 10 provides the customer with confirmation information (screen P8), and then transmits the print order information such as image data to a distribution laboratory, etc. that is exclusively used for the distribution, and designated in each of areas. Then, prints, outputted by the print output device placed at the distribution laboratory, etc., are delivered to the address specified by the customer as the destination of delivery.

As described above, in the first preferred embodiment, based upon the "conditions of a delivery site" given by the customer, the center server 10 extracts a delivery shop candidate group suitable for the "conditions of a delivery site" among a plurality of shops capable of the delivery of the prints, and transmits print order information to a print output device placed in the delivery shop selected by the customer among the delivery shop candidate groups as the delivery side for the prints. Therefore, the customer can readily receive the ordered prints at the delivery shop that the customer has determined in accordance with his or her needs; thus, it is possible to provide a convenient service. Moreover, since the output of the prints is carried out by the print output device 30 placed at the delivery shop, the transferring time of the prints is shortened (zero in an optimal case) as compared with a case in which the print output is carried out by a print output device at another place (for example, at a distribution laboratory) and transferred to the delivery shop. Consequently, it is possible to readily receive the prints.

Moreover, the postal number of a place the customer desires as the delivery site for the prints is used as identification information relating to the delivery site for the prints. In this case, as compared with a case in which the address is inputted as the identification information, it is possible to make the inputting operation easier, and consequently to provide a further convenient service.

Since the print order information, given to the center server 10 by the customer, contains customer identification data for identifying the customer, it is possible to improve reliability in the transaction. Moreover, since the charging process is carried out based upon the customer identification data, it is possible to provide a further convenient service. For example, the settlement of accounts can be made by charging the bill directly to the customer's bank account, thereby providing an easier means for settlement of accounts to the customer. This arrangement is particularly effective when the recipient is different from the customer (the one who placed the order).

Moreover, the shops capable of the delivery of prints, which are provided with print output devices 30, include various processing laboratories, convenience stores, etc.; thus, the customer is allowed to determine a desired delivery shop as the delivery site for the prints among more shops, thereby making it possible to provide a further convenient service.

2. Second Preferred Embodiment

<A. Constitution>

<Outline>

Figure 12:
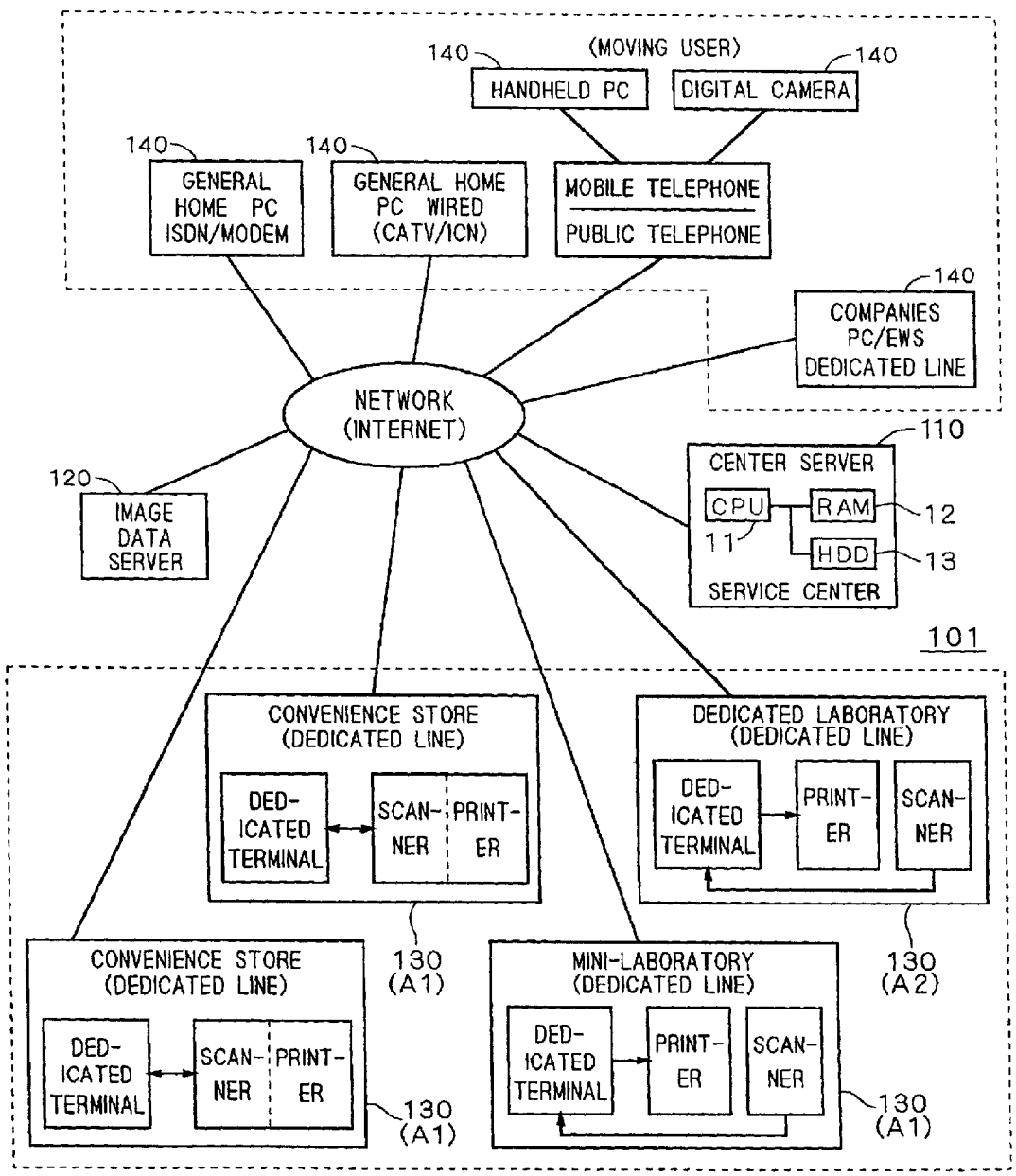
FIG. 12 is a drawing that shows a conceptual structure of network photo-print service system 101 in accordance with the second preferred embodiment of the present invention.

FIG. 12 is a drawing that shows a conceptual structure of a network photo-print service system 101 in accordance with the second preferred embodiment of the present invention. This network photo-print service system 101 takes orders for photo-prints from customers through a network and executes print output services in response to the orders.

As illustrated in FIG. 12, this system 101 is provided with a center server 110 for taking orders from customers, a print output device 130 for executing print output processes in response to the orders, and an image data server 120.

Moreover, the customer is allowed to connect to a network through the customer-side terminal 140, and through the network, the customer makes an access to a receiving portion 115 (which will be described later, see FIG. 13) that is functionally constituted in a center server 110 so that the above-mentioned photo-print service becomes available.

The center server 110, the image data server 120, the print output device 130 and the customer-side terminal 140 in the second preferred embodiment have the same arrangements respectively as the center server 10, the image data server 20, the print output device 30 and the customer-side terminal 40 in the first preferred embodiment. The following description will mainly discuss a difference from the first preferred embodiment.

Moreover, the system 101 is also provided with the image data server 120; however, the present system 101 is not necessarily provided with the image data server 120, and the present system 101 may be constituted by the center server 110 and the print output device 130, which is the same construction as the aforementioned preferred embodiment.

Here, the print output device 130 is classified into devices of two types, that is, a first print output device A1 and a second print output device A2. The print output device 130 is classified into the devices A1 and A2 of the two types depending on whether or not it can carry out the respective processes of two kinds classified based upon a predetermined reference.

Of these two types, the first print output device A1 is a device that carries out a comparatively simple printing process (a first printing process which will be described later), and the second print output device A2 is a device that can carry out a comparatively high-degree printing process that can not be executed by the first print output device A1 (a second printing process, which will be described later). For example, the first print output device is designed as a device to output only prints of not more than a predetermined size and the second print output device A2 is designed as a device to output prints having sizes larger than this size. Here, the second print output device A2 may be designed to carry out the first printing process.

Here, it is supposed that the first print output device A1 is placed in each of a plurality of shops capable of delivering prints (receiving prints) (hereinafter, referred to as "delivery shops"), while the second print output device A2 is placed in each of a plurality of shops that are incapable of delivering prints (receiving prints) (hereinafter, referred to as "non-delivery shops"). In FIG. 12, the first print output device A1 is placed in convenience stores and mini-laboratories that are the "delivery shops", and the second print output device A2 is placed in dedicated laboratories that are the "non-delivery shops".

<Center Server 110>

Figure 13:
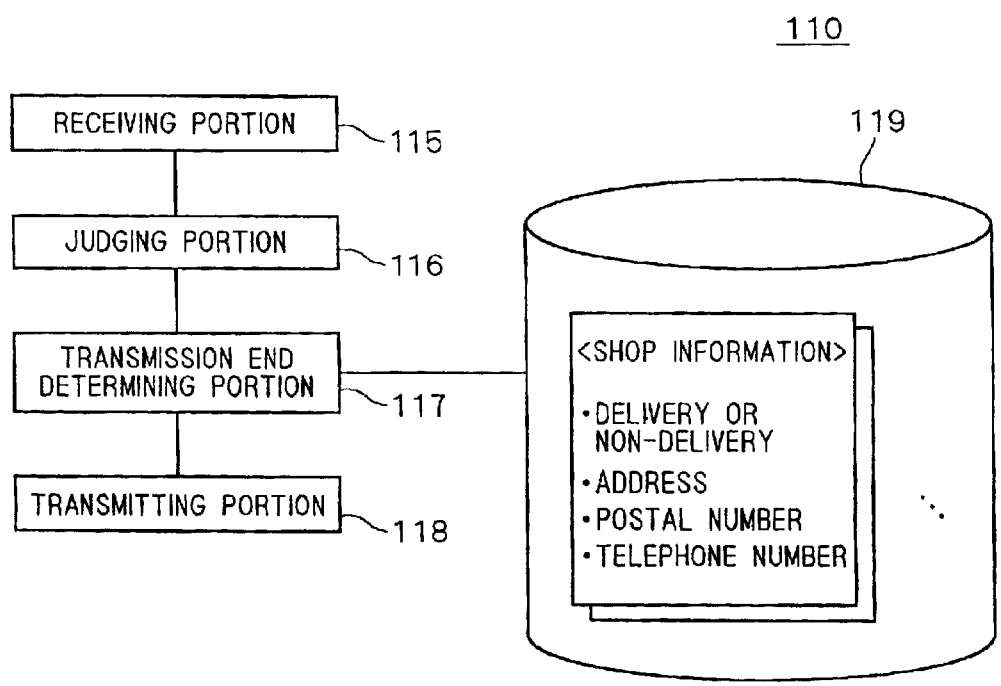
FIG. 13 is a block diagram showing a center server 10.
Figure 14:
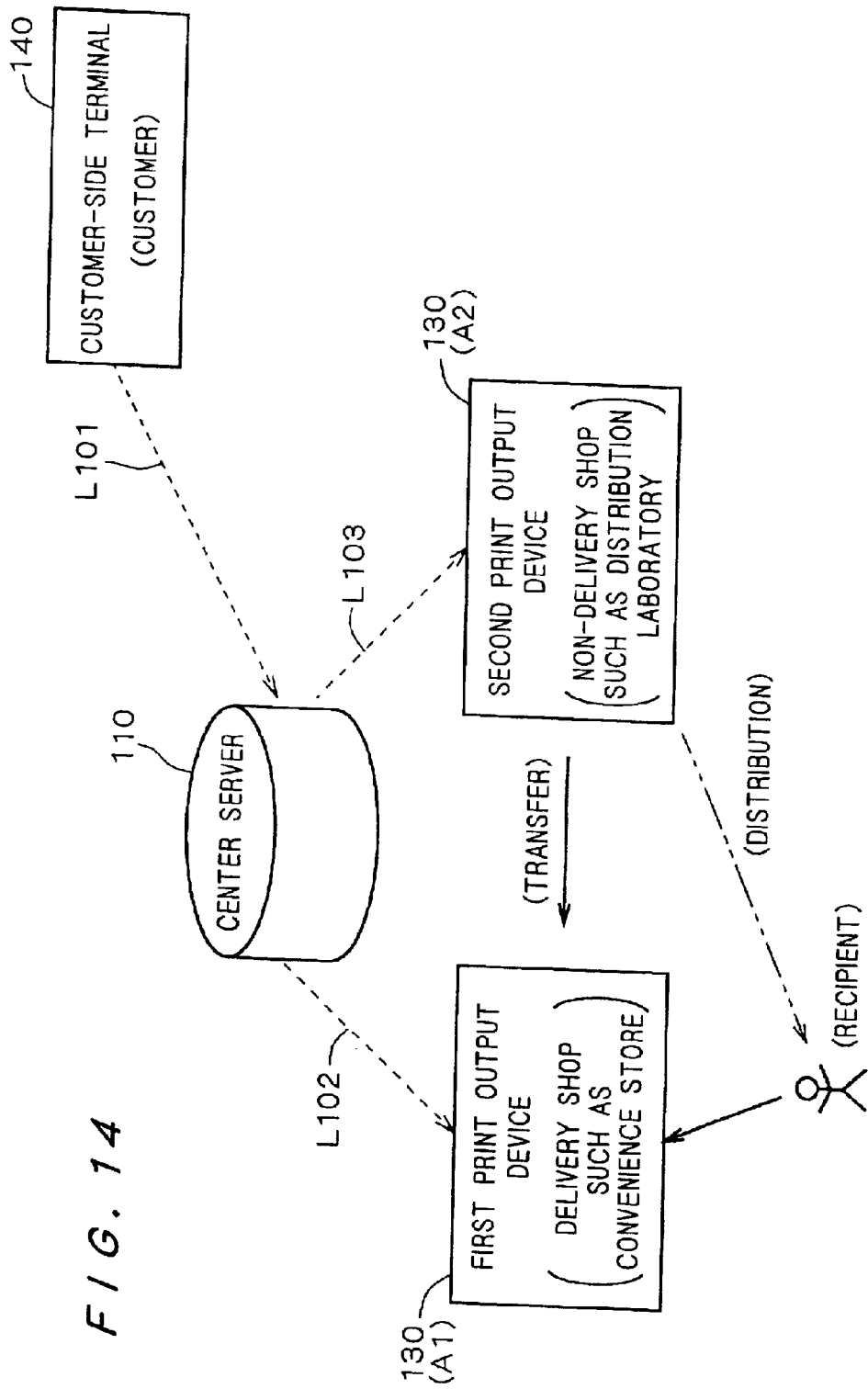
FIG. 14 is a conceptual drawing that shows a flow of data, etc. in a system 101.

As illustrated in FIG. 12, with respect to hardware, the center server 110 is arranged as a computer system constituted by a CPU 11, a main storage section 12 provided with a semiconductor memory such as a RAM (and/or a ROM), and an auxiliary storage section 13 such as a hard disk drive (HDD). Here, such a computer executes, a predetermined program so that various functions as the center server 110, which will be explained next, are exerted. Referring to FIGS. 13 and 14, an explanation will be given of these functions. FIG. 13 is a functional block diagram showing the center server 110, and FIG. 14 is a conceptual drawing that shows a data flow in the present system 101.

As illustrated in FIG. 13, the center server 110 is provided with functional portions such as a receiving portion 115, a judging portion 116, a transmission end determining portion 117, a transmitting portion 118 and shop information storage portion 119.

Among these portions, the receiving portion 115 receives "print order information" related to an order for prints and "information concerning conditions related to a delivery site for prints" outputted in accordance with the order from a customer through the network. In other words, as illustrated in FIG. 14, the customer makes an access to the center server 110 through the network by means of a customer-side terminal 140 and inputs the above-mentioned pieces of information so that operations for print orders, etc. are carried out. These operations are indicated by a broken line L101 in FIG. 14, and in this manner, the center server 110 receives the "print order information" and "information concerning conditions related to a delivery site for prints".

Here, as described earlier, the "print order information" (see FIG. 4) contains "receipt number" added to the order in accordance with predetermined rules such as ordering time, "image data" that is a subject of the print output process, data related to the contents of the print output process (for example, "print size" (size) and "the number of prints"), and "customer identification data" (for example, member's number and pass number) for identifying customers. Moreover, "information concerning conditions related to a delivery site for prints" (hereinafter, referred to as "conditions for delivery site") shows conditions given by the customer upon deciding the print delivery site. Such conditions include, for example, identification information related to a desired print delivery site (postal number, telephone number).

Moreover, with respect to the print order information thus obtained, the judging portion 116 makes a judgment as to whether the contents thereof relate to the first printing process or the second printing process. The first printing process refers to a process which can be outputted by the first print output device A1, and the second printing process refers to a process which can he outputted by the second print output device A2, although it cannot be outputted by the first print output device A1. For example, the first printing process is a print output process related to a size not more than a predetermined size and the second printing process is a print output process related to a size greater than this size.

Furthermore, when the judgment by the judging portion 116 shows that the printing process is the first printing process, the transmission end determining portion 117 determines a specific shop that is a transmission subject among a plurality of shops (delivery shops) each of which is provided with the first print output device A1. In contrast, when the judgment by the judging portion 116 shows that the printing process is the second printing process, the transmission end determining portion 117 determines a specific shop that is a transmission subject among a plurality of shops (non-delivery shops) each of which is provided with the second print output device A2.

For example, when the judgment by the judgment potion 116 shoves that the printing process is the first printing process, the transmission end determining portion 117 extracts a delivery shop candidate group suitable for "conditions for delivery site" from a plurality of shops capable of delivery of the prints. This extraction process is carried out based upon shop information, (address, postal number, telephone number, etc.) related to a plurality of shops stored in the shop information storage portion 119 and information related to conditions for print delivery site given by the customer. More specifically, by utilizing the fact that postal numbers have a hierarchical arrangement related to districts, for example, among seven digits of the postal number, those shops having postal numbers with upper five coincided digits may be extracted as a delivery shop candidate group. Alternatively, in order to improve the extraction precision at adjacent areas such as prefecture borders and city borders at least one postal number to be extracted is preliminarily determined with respect to postal numbers, and those shops having at least the corresponding postal number may be extracted as a delivery shop candidate group. Moreover, the delivery shop determining portion 117 (see FIG. 13) calls for the customer to select one of the shops from the delivery shop candidate group as the print delivery site, and determines the delivery site in accordance with the selection of the customer. For example, it provides the customer with information including a list of the delivery shop candidate group, and the customer is allowed to select a desired one of them in accordance with his or her needs and determine the print delivery site by receiving the information.

In contrast, when the judgment made by the judging portion 116 shows that the printing process is the second printing process, the transmission end determining portion 117 selects and determines one of a plurality of shops (non-delivery shops), each of which is provided with the second print output device A2 capable of the second printing process. This determining process is carried out, for example, by extracting shops (non-delivery shops) that correspond to the delivery shop selected by the customer, from a plurality of shops (non-delivery shops) based upon a predetermined reference. With respect to the predetermined reference, a reference that is made by taking it into account whether or not it is close to the selected shop in terms of time and/or distance may be adopted. As will be described later, this arrangement makes it possible to shorten the time required for transmitting the prints outputted by the second print output device A2 (of the non-delivery shop), and consequently to provide a further convenient service to the user (customer, recipient, etc.) of the present system 101.

Thus, when the judgment made by the judging portion 116 shows that the printing process is the first printing process, the transmitting portion 118 transmits print order information to the first print output device A1 (see broken line L102 of FIG. 14), and when the judgment made by the judging portion 116 shows that the printing process is the second printing process, the transmitting portion 118 transmits the print order information to the second print output device A2 (see broken line L103 of FIG. 14).

In the first print output device A1 and the second print output device 2, based upon the print order information sent from the center server 110, respective print output processes are carried out. In other words, the first print output device A1 carries out the first printing process, and the second print output device A2 carries out the second printing process. Moreover, the prints outputted by the second print output device A2 placed in the non-delivery shop are transported to the corresponding delivery shop by a transport means such as a vehicle.

Thus, the customer can receive the ordered prints at the delivery shop that has been selected as the delivery site.

Here, an explanation has been given of a case in which the person who receives the prints (recipient) is the same person that has ordered the prints (customer); however, the present invention is not intended to be limited by this, and the present invention can be applied to a case in which the prints are received by a person other than the customer, such as a friend or an acquaintance of the customer. In this case, with respect to the above-mentioned "conditions for print delivery site", the above-mentioned condition for the delivery site at which the friend, or the acquaintance, etc. will receive the prints is added thereto. In other words, the customer gives a postal number (or telephone number, etc.) of a desired recipient and its desired delivery site to the receiving portion 115 of the center server 110 as the above-mentioned conditions; thus, in the same manner as described above, the print order information is sent to the first print output device A1 placed in a delivery shop that has been determined from the delivery shop candidate group, or to the second print output device A2 placed in a non-delivery shop that is located in the vicinity thereof. Thus, after the recipient (the friend or acquaintance of the customer) has been informed by the customer of the delivery in a separate manner, the recipient can obtain the prints at the delivery shop selected by the customer.

<B. Operation>

Figure 15:
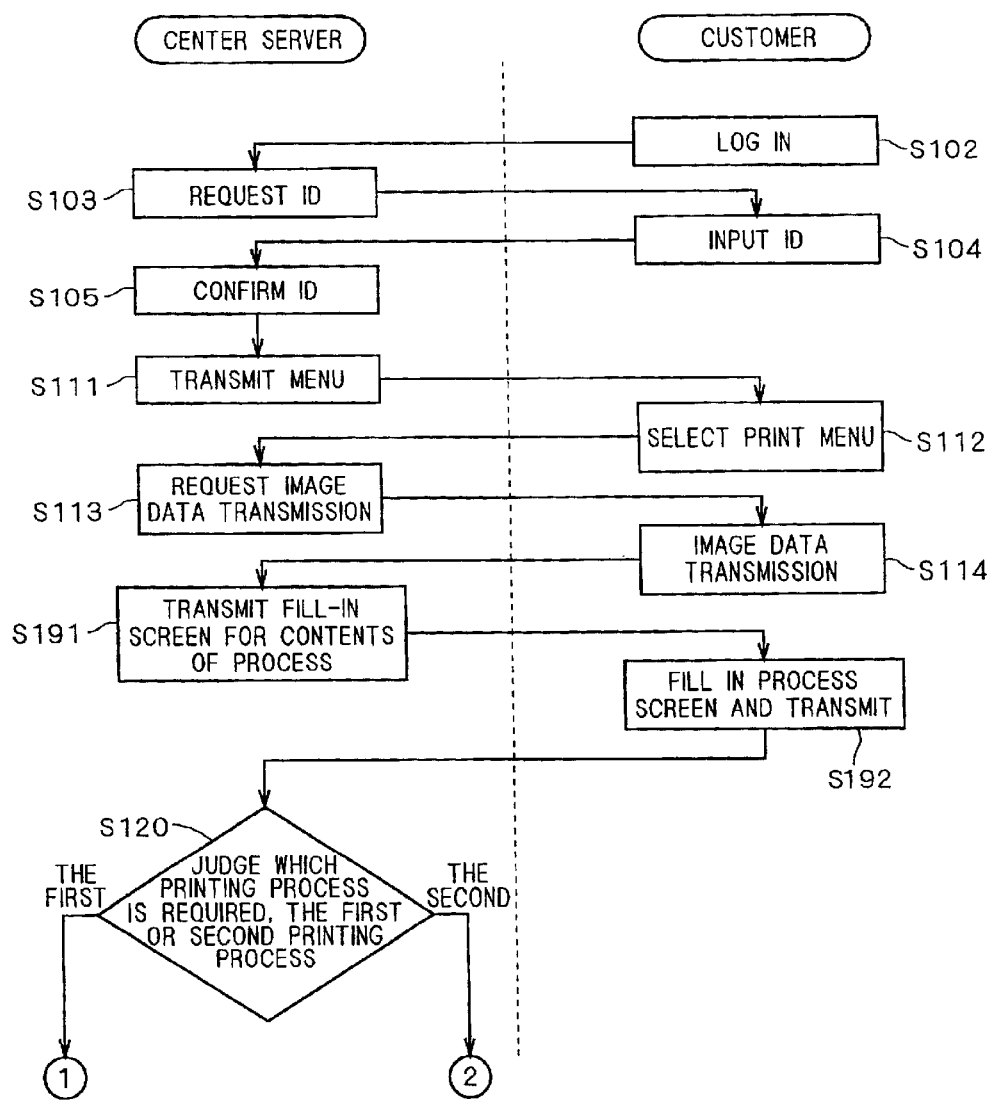
FIG. 15 is a flow chart that schematically shows the operation in the system 101.
Figure 16:
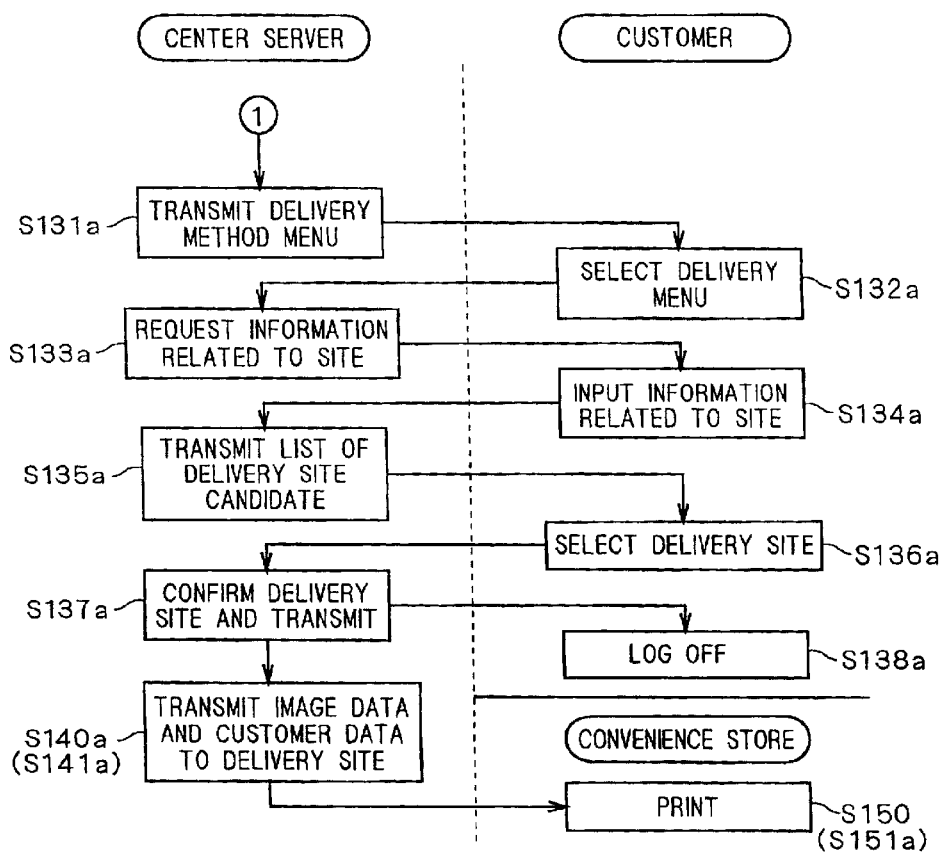
FIG. 16 is a flow chart that schematically shows the operation in the system 101.
Figure 17:
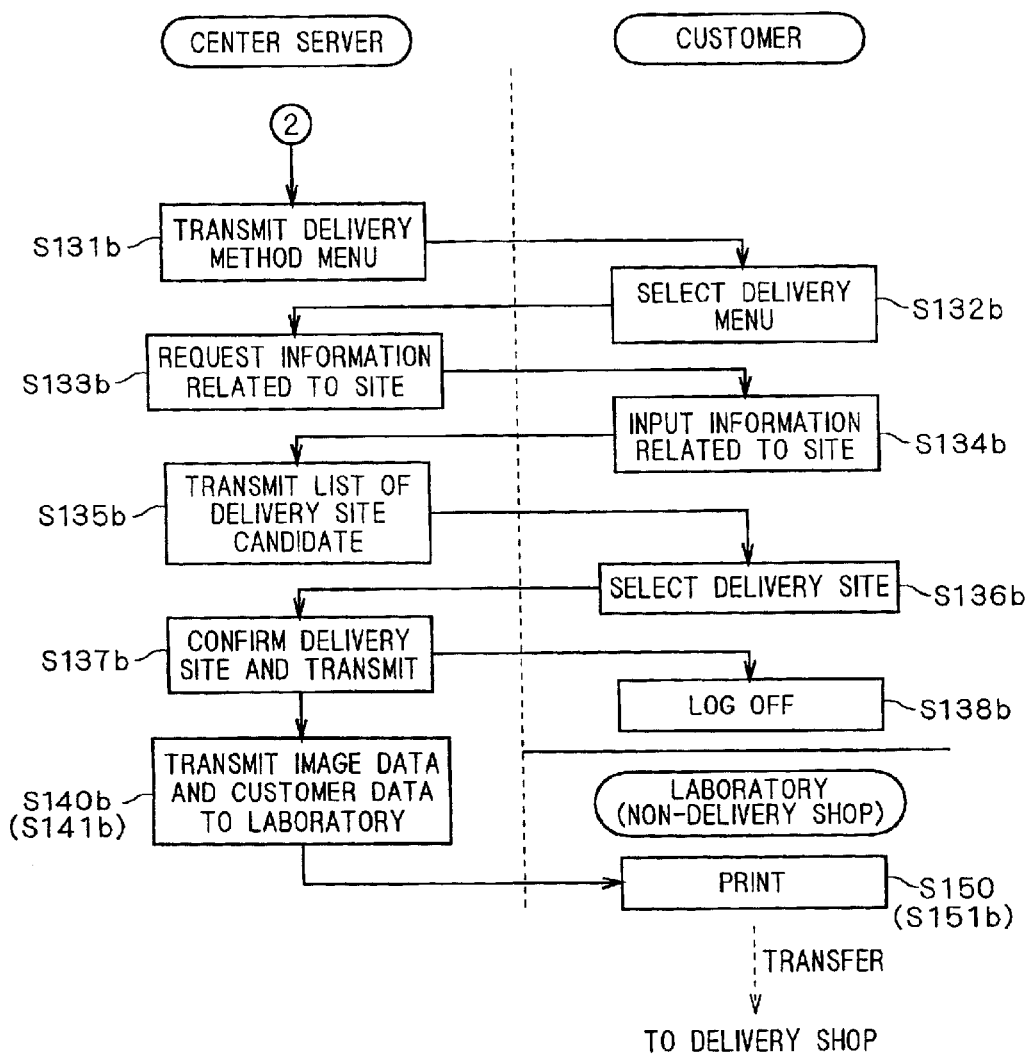
FIG. 17 is a flow chart that schematically shows the operation in the system 101.

Next, a detailed explanation will be given of the operation of the present system 101. FIGS. 15 to 18 are flow charts that schematically show the operations of the present system 101. FIGS. 15 to 17 explain the respective operations in the center server 110, the print output device 130 and the customer-side terminal 140, mainly with respect to their communication operations, and FIG. 18 mainly explains the operation of the center server 110 among these.

Figures 18, 19:
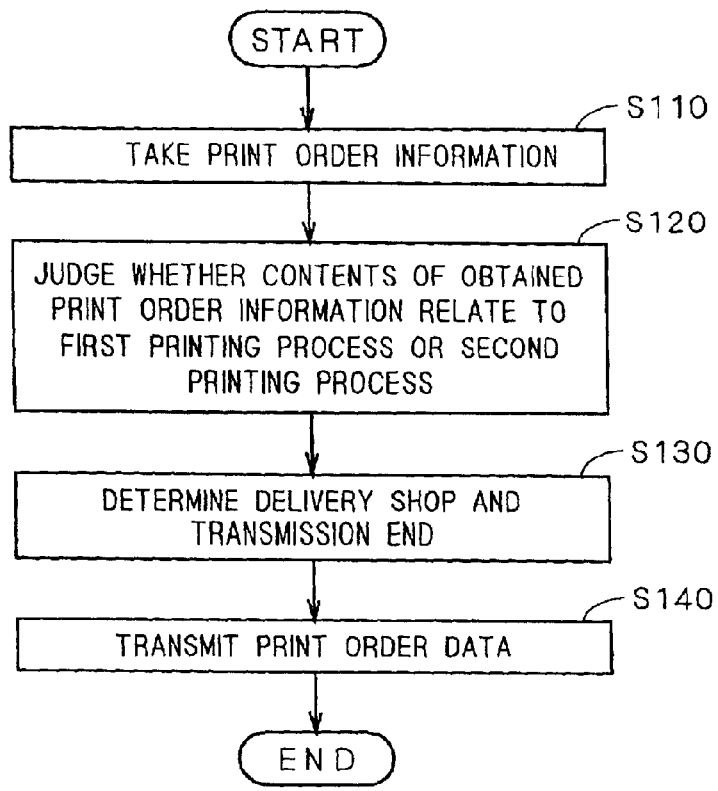
FIG. 18 is a flow chart that shows the operation in a center server 110.
FIG. 19 is a drawing that shows a log-in menu screen P101.

First, as illustrated in FIG. 15 at step S102, the customer accesses the center server 110 and tries to log in. More specifically, the customer has a home page such as "print order taking service" displayed on the monitor of the customer-side terminal 140 through the WWW browser, and the log-in is made by pressing "a print service taking button", etc. contained in the home page. In response to the pressing down, etc. of the taking button, the center server 110 requests the customer to input the customer identification data (ID data) (step S103), and the customer then inputs his or her own customer identification data (step S104). FIG. 19 is a drawing that shows one example of this log-in menu. The screen P101 of FIG. 19 exemplifies a case in which a member's number and its corresponding pass number are requested as the customer identification data, and the customer inputs his or her member number and the pass number.

Here, this operation has been explained on the assumption that the customer has already owned his or her customer identification data. The customer identification data is issued by the center server 110, etc. when a member registration has been made. The operation for this purpose is carried out through another member registration screen, etc. In the case when the customer has not been registered, after obtaining the customer identification data through the member registration screen, the customer can again return to the screen P101 of FIG. 19 and carry out the corresponding operation. This confirmation process through such customer identification data makes it possible to improve reliability in the transaction. Moreover, since the identification of the customer is available, various modifications can be made, that is, for example upon receiving the payment for the prints. in addition to payment in cash at the print delivery shop, the bill may be directly drawn from the customer's bank account.

In FIG. 19, when the customer inputs his or her member number and pass number, the center server 110 confirms whether or not the inputted customer identification data is correct (step S105 in FIG. 15). If not correct, the request for the input is again made, and if it is correct, the sequence proceeds to the next operation.

At step S111, the center server 110 transmits a menu to the customer-side terminal 140. FIG. 20A is a drawing that shows one example of this menu screen P102. In the screen P102, the display contains four selections. That is, "1. print order" is a selection menu for placing an order (request) for prints, and "2. confirmation for the contents of the order" is a selection menu for confirming the contents of the precious order. Moreover, "3. confirmation for the state of the print" is a selection menu for confirming whether the prints thus ordered can be delivered or not (have been printed or not), and "4. alteration of registered data" is a selection menu for altering the registered data. The customer selects a desired selection menu from the selection menus displayed on the screen P102 and inputs the corresponding number (step S112). Here, this explanation is further given on the assumption that the menu, "1. print order", has been selected.

Next, at step S113, the center server 110 requests the transmission of image data as a subject image for the print output process. In response to this, the customer sends the image data as the subject image (step S114). Thus, the center server 110 is allowed to obtain the image data.

Next, at step S191, the center server 110 transmits a process contents input screen P111 to the customer-side terminal 140. FIG. 20B is a drawing that shows one example of this screen P111. In this case, the displayed screen requests the input of the number of prints and size (service size, octavo size, quarto size, etc.) for each of a plurality of image data (six, in this case) sent in the above-mentioned step S114. In response to this, the customer selects and inputs the number of prints and size for each of the image data (step S192). Thus, the center server 110 is allowed to obtain the data (the print size and the number of prints) related to the contents of the printing process selected and inputted, through the network. Here, in the case where a print order is made for image data of not less than seven, even with respect to the seventh image data and thereafter, the same screen as the screen P111 is used so as to further repeat the same operations as steps S191 and S192; thus, the number of prints for each piece of image data is inputted.

In this case, the order for "service size" in the print size is dealt as "the first printing process", and the order for "octavo size" or "quarto size" in the print size is dealt as "the second printing process". Here, for convenience of explanation, it is supposed that sizes of a plurality of kinds are not selected in one order.

As shown in step S110 of FIG. 18, the center server 110 receives the print order information related to print order from the customer through the network.

Next, as shown in FIG. 15 (and FIG. 18), at step S120, the center server 110 allows the judging portion 116 to carry out its judging operation. In other words, the judging portion 116 makes a judgment as to whether or not the contents of the print order information thus obtained relate to the first printing process or the second printing process.

Referring to FIG. 16, the following description will discuss a case in which the judgment shows that the contents of the print order information relate to the first print process.

Figure 22:
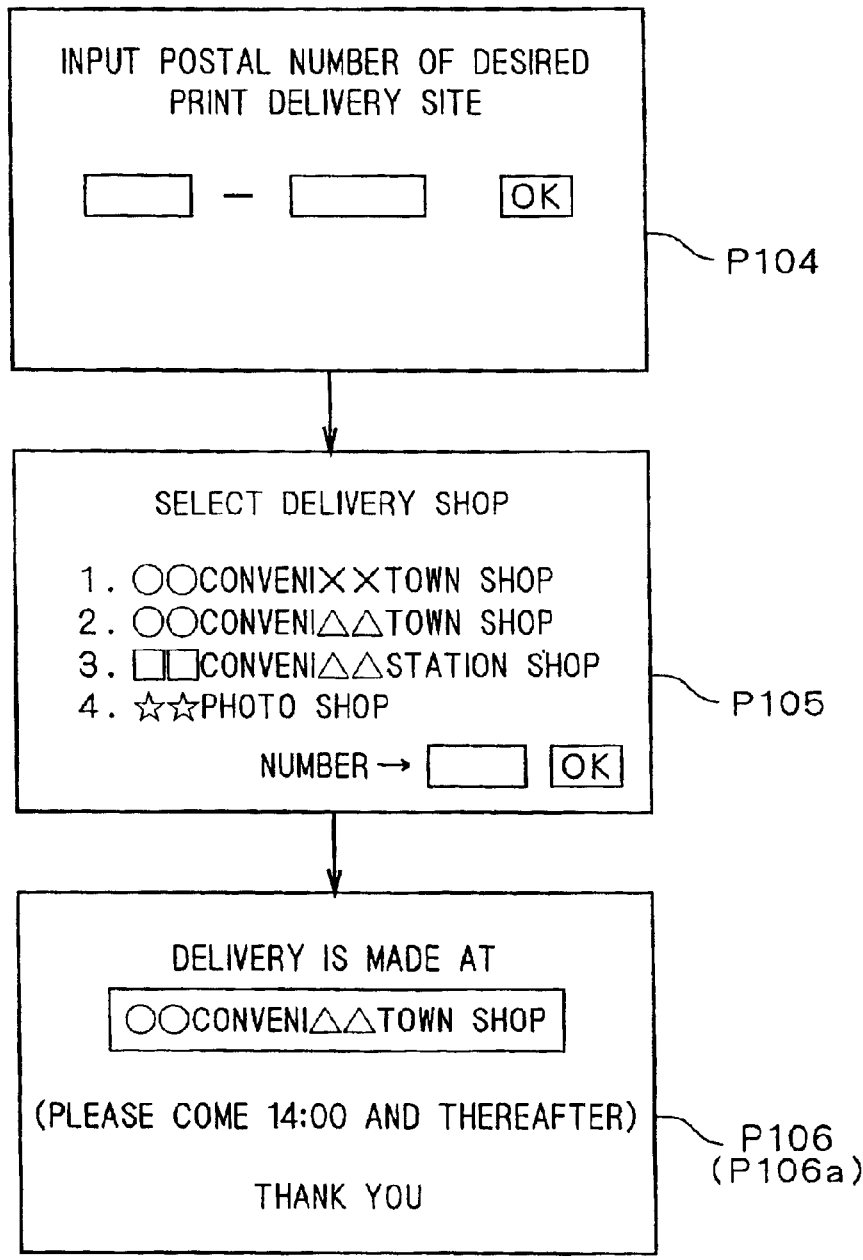

As shown in FIG. 16, at the next step S131a, the center server 110 transmits a menu for delivery methods so that a request is given to the customer so as to make a selection of the print delivery method for the outputted prints. For example, FIG. 21 shows a screen P103 used for this purpose. Here, in response to the request, the customer selects any one of the methods. In this screen P103, an explanation will be further given of a case in which "2. specified delivery shop" is selected. FIG. 22 shows screens P104, P105 and P106 (P106a) that are displayed on the customer-side terminal 140, with respect to processes to be continuously carried out after the "2. specified delivery shop" has been selected at step S131a of FIG. 16.

At step S133a, the center server 110 requests the customer to input information related to the site, that is, "conditions of a delivery site". The screen P104 of FIG. 22 is a screen requesting for a postal number of the desired site at which the print delivery is to be made as one of such conditions (more specifically, a postal number of the place at which the desired delivery shop is located or a postal number of an area in the vicinity thereof). When the customer wants to specify a shop (closest to) located in the vicinity of the customer's home, the recipient (customer) is allowed to input the postal number of his or her own address as one of the "conditions of a delivery site" (step S134a). This arrangement allows the center server 110 to obtain information related to the "conditions of a delivery site" through the network.

Next, as shown in FIG. 16, at step S135a, the center server 110 shows the delivery shop candidate group extracted as a group suitable for the above-mentioned conditions to the customer, and requests the customer to select a desired delivery shop from the group. The screen P105 of FIG. 22 shows a case in which four shops have been extracted as a group of delivery shops suitable for the "conditions of a delivery site". Here, three convenience stores (hereinafter, referred to as "conveni-stores") and one laboratory (photoshop) are extracted, and displayed on the screen P105 of the customer-side terminal 140. Each of these four shops is a delivery shop in which the print output device A1 is placed.

Upon receipt of the request, the customer selects one of the shops as a delivery site (step S136a of FIG. 16). In response to this selecting operation, the center server 110 is allowed to obtain information as to which shop is selected and determined as the print delivery site. Then, the received information is presented to the customer so as to confirm the shop (that is, the delivery shop) which has been determined as the delivery site (step S137a). The screen P106 of FIG. 22 shows an example for this confirmation screen, and for example, this screen indicates the name of the delivery shop, and the date and time at which the delivery is available ("at 14:00 and thereafter" of the day in the Figure).

After confirming the information displayed on the screen P106, the customer logs off (step S138a). Thus, the operation on the customer-side terminal 140 is complete.

On the center server 110 side, in the next step S141a (FIG. 16), the transmitting portion 118 transmits the print order information to the first print output device A1 installed in the delivery shop (in this case, a convenience store) selected by the customer as the print deliver site. The print order information includes "image data" that is a subject for the print output process, data (the print size and the number of prints) related to the contents of the print output process and customer identification data (member's number, etc.) for identifying the customer.

Then, upon receipt of the respective data sent (transmitted) from the center server 110, the print output device 130, placed in the delivery shop, carries out a print output operation for the image data that is the subject for the print output process in accordance with the data (the print size and the number of prints) related to the contents of the print output process. Since the printing process related to this order is "the first printing process", the printing process is carried out by the first print output device A1 placed in the delivery shop. In this manner, the corresponding prints, ordered by the customer through the network, are formed (step S151a in FIG. 16).

Thereafter, the recipient (in this case, the customer) goes to the selected shop (delivery shop) so as to receive the ordered prints.

In the case when, at the above-mentioned step S120 (FIG. 15), the judgment shows that the contents of the print order information relate to the first printing process, the operations as described above are carried out.

Next, referring to FIG. 17, the following description will discuss a case in which, at step S120 (FIG. 15), the judgment shows that the contents of the print order information relate to the second print process.

FIG. 17 is a flow chart that relates to the operation carried out when the judgment shows that the contents of the print order information relate to the second print process. At steps S131b to S138b in FIG. 17, the same operations as steps S131a to S138a in FIG. 16 are carried out.

Thereafter, at step S141b, the print order information is transmitted by the transmitting portion 118 of the center server 110. In this case, the transmission end is a laboratory (dedicated laboratory) serving as a non-delivery shop, which makes it different from the case of FIG. 16 where the transmission end is a delivery shop (convenience store). This is because, based on the fact that the contents of the print order information relate to the second printing process, the print order information is transmitted to the second print output device A2 capable of such a print output. Consequently, in the second print output device A2 having high-degree printing functions, the second print output (in this case, a print output process of a large size, such as "octavo size" and "quarto size") is carried out.

Moreover, at step S141b, in addition to the print order information, information related to the delivery shop (that is, the name, etc. of the delivery shop selected by the customer) is transmitted to the second print output device A2 placed in the laboratory serving as a non-delivery shop. This is because it is assumed that, after the print output process by the second print output device A2, the resulting prints are transported to the delivery shop specified by the customer as the delivery site for the prints.

Then, based upon the information of the name, etc. of the delivery shop sent together with the print order information, the prints outputted by the second print output device A2 are transported to the delivery shop specified by the customer as the delivery site. The transporting process is carried out by a vehicle, etc., and for example, it is possible to use a regular run that goes around respective delivery shops, starting from the dedicated laboratory as the non-delivery shop.

After the ordered prints have been transported to the delivery shop, the recipient (for example, the customer) goes to the delivery shop and receives the prints.

Figure 23:
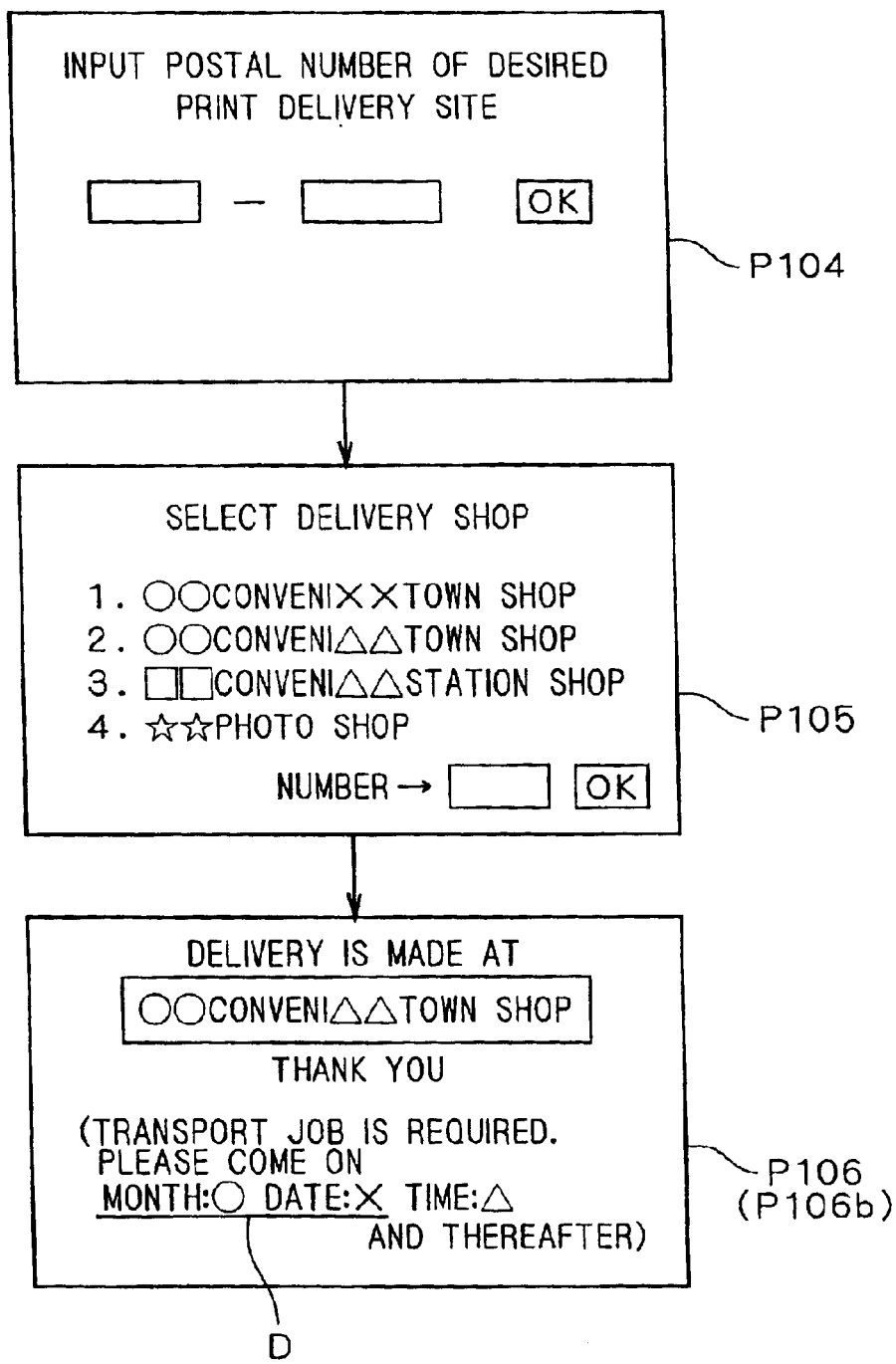
FIG. 23 is a drawing that shows screens P104, P105 and P106b.

Here, the above-mentioned laboratory (dedicated laboratory) is a non-delivery shop, and a period of time is required for transporting the prints outputted by the second print output device A2 to the delivery shop. Therefore, in general, there is a delay in the time when the recipient is allowed to receive the prints as compared with the case in which prints from the first printing process are received at a delivery shop in which the first print output device A1 is placed. FIG. 23 shows screens P104, P105, P106 (P106a) that are displayed on the custom-side terminal 140 in connection with processes successively carried out after, at step S131b of FIG. 17, "2. specified delivery shop" has been selected, and this Figure corresponds to FIG. 22. The screen P106b of FIG. 23, which corresponds to the screen P106a of FIG. 22, shows a case in which a date D, the next day and thereafter in FIG. 23 is displayed is the delivery date by taking the transporting time into account. The customer confirms the date and time displayed on the screen P106b and recognizes that the prints are available on the date and thereafter.

In the case when at the above-mentioned step S120 (FIG. 15), the judgment shows that the contents of the print order information relate to the second printing process, the above-mentioned operations are carried out.

In this manner, the present system 101 receives an order for photo-prints from the customer through the network, and is allowed to carry out the print output service in response to the order.

Figure 24:
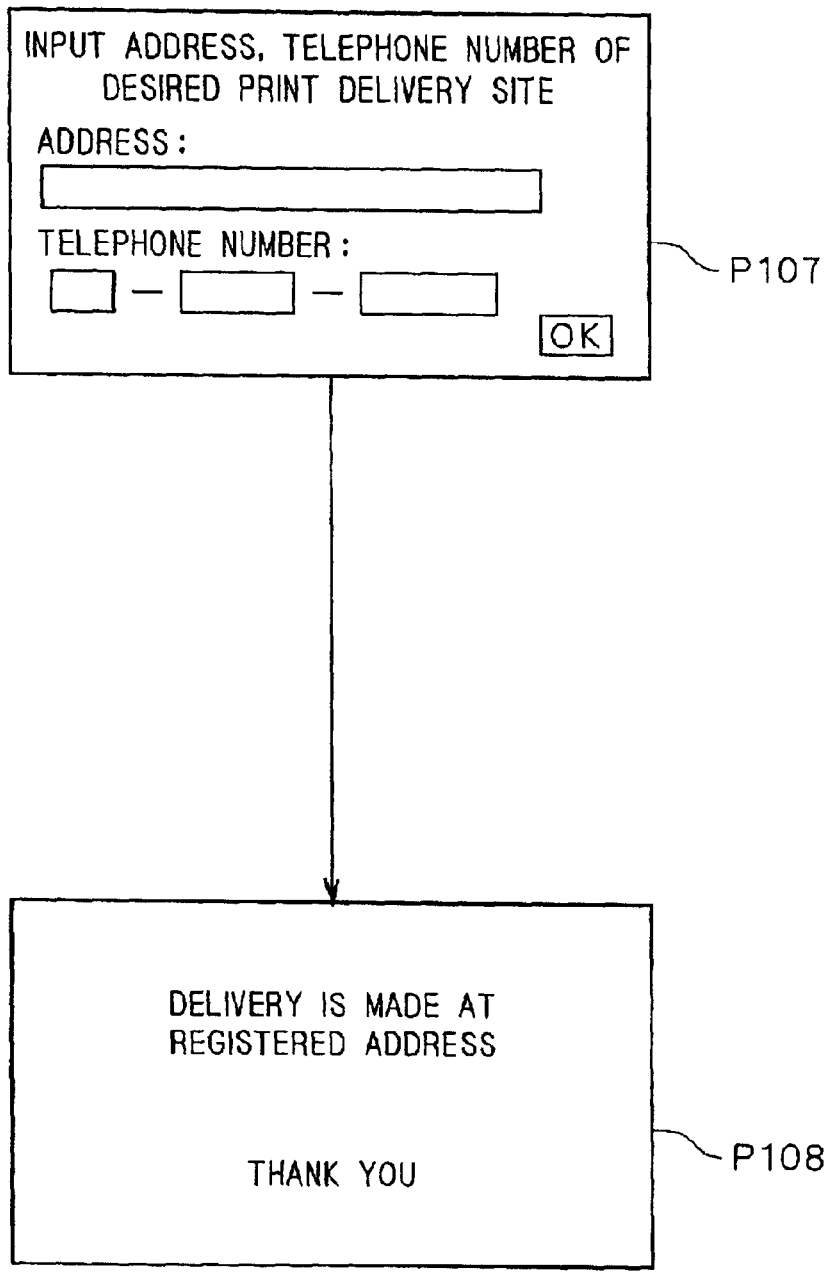
FIG. 24 is a drawing that shows screens P107 and P108.

Here, the above description has shown a case in which, in the screen P103 of FIG. 21 (steps S131a, S131b, S132a and S132b in FIGS. 16 and 17), "2. specified delivers shop" is selected; however, in the case when "1. home delivery" is selected, the sequence proceeds to the screen P107 of FIG. 24, and the address and telephone number of a delivery end are inputted so as to register the delivers end.

Then, after having supplied confirmation information to the customer (screen P108), the center server 110 transmits print order information such as image data to a distribution laboratory dedicated to delivery that is specified in the corresponding area. This distribution laboratory is provided with both of the first print output device A1 and the second print output device A2 so that both of the first printing process and the second printing process are available. Therefore, whether the print order information relates to the first printing process or the second printing process, the transmitting portion 118 of the center server 110 selects the distribution laboratory as the transmission end for the print order information and transmits the print order information thereto in any of these cases.

Here, in the case when the distribution laboratory is provided with a multi-functional print output device capable of carrying out both the first printing process and the second printing process (in other words, the second print output device A2 is allowed to carry out the first printing process), the same operations are also carried out, and in this case also, both of the kinds of printing processes (that is, the first printing process and the second printing process) are available.

Then, the prints outputted from the print output device of this type are delivered to the address specified by the customer as the transmission end.

FIG. 25 is a drawing that shows which print output device carries out print outputs in response to each of the kinds of printing processes and each of the print delivery methods. As shown in FIG. 25, in the case when the prints are received at a shop (delivery shop), the corresponding one of the first print output device A1 and the second print output device A2 is used in accordance with the kind of the printing process in question. In contrast, in the case of the home delivery, the print output is carried out by the print output device A2 in any of the cases. Here, in the case when the home delivery is selected with the kind of the printing process being set to the first printing process, the print output is also carried out by the second print output device A2, and this is based upon the premise that the second print output device A2 placed in the distribution laboratory is also capable of carrying out the first printing process. In this case, the first printing process may of course be carried out by the first print output device A1.

As described above, the center server 110 transmits the print order information to the first print output device A1 in the case of the contents of the printing process relating to the first printing process, and also transmits the print order information to the second print output device A2 in the case of the printing process relating to the second printing process; therefore, the printing process is carried out by properly assigning the job to the first print output device and the second print output device depending on the contents of the printing process. Therefore, it is possible to construct an efficient system which properly carries out the printing process in accordance with the contents thereof.

Moreover, in the case of the contents of the printing process relating to the first printing process, the print order information is transmitted to the first print output device A1 placed in a delivery shop such as a convenience store specified by the customer as the print delivery site; therefore, the prints, outputted from the first print output device A1, are readily received at the delivery shop specified by the customer so that it is possible to provide a more convenient service. In particular, since the first print output device A1 has fewer functions than the second print output device A2 (or is not a high-grade device), it is manufactured at lower costs. Therefore, since it is possible to distribute the first print output devices A1 to more shops, the users of the present system 101 are allowed to make a selection from more shops, thereby making it possible to provide a further convenient service.

Furthermore, in the case of the contents of the printing process relating to the second printing process, the print order information is transmitted to the second print output device placed at a non-delivery shop, and thereafter, the prints, outputted by the second print output device, are transported to the corresponding delivery shop so that they are received at the desired print delivery shop.

Here, since the print order information, given to the center server 110 by the customer, contains customer identification data for identifying the customer, it is possible to improve reliability in the transaction. Moreover, since the charging process is carried out based upon the customer identification data, it is possible to provide a further convenient service. For example, the settlement of accounts can be made by charging the bill directly to the customer's bank account, thereby providing an easier means for settlement of accounts to the customer. This arrangement is particularly effective when the recipient is different from the customer (the one who placed the order).

Moreover, the shops capable of the delivery of prints, which are provided with print output devices 130, include various processing laboratories, convenience stores, etc.; thus, the customer is allowed to determine a desired delivery shop as the deliver site for the prints among more shops, thereby making it possible to provide a further convenient service.

3. Modified Examples

In the above-mentioned preferred embodiments, examples for various data communications have been given; however, the present invention is not limited by these. For example, the step S10 (FIG. 5) of the first preferred embodiment shows a case in which customer identification data, data related to the contents of the print output process and image data are received by the center server 10 in this order in a separate manner; however, these data may be separately received in a different order, or all the data may be received at once. The same is true for the second preferred embodiment.

Moreover, in the above-mentioned respective preferred embodiments, explanations have been given of a case in which "postal number" of a desired delivery site for prints is inputted as identification information related to a print delivery site; however, as shown in screen P9 of FIG. 26. "telephone number" of a desired delivery site for prints may be inputted. For example, in the first preferred embodiment, this screen P9 is used in place of screen P4 (FIG. 10) so that the center server 10 requests the user to input a telephone number; thus, the center server 10 is allowed to receive the telephone number through the input from the customer. In this case, since the telephone number functions as the identification information related to a print delivery site, it is preferable to use the telephone number of a wire telephone (or fixed telephone) rather than that of a mobile wireless telephone whose address is difficult to identify (or impossible to identify). In this arrangement, at step 20 (FIG. 6), these shops having telephone numbers that are closely related to a corresponding area can be extracted as a delivery-shop candidate group, based upon the area number, city number, etc. The same is true for the second preferred embodiment.

Moreover, in the above-mentioned preferred embodiments, image data as a subject image for the print output process is transmitted from the customer to the center server 10 (110) together with the print order information, however, the present invention is not intended to be limited by this arrangement.

For example, in the first preferred embodiment, in the case when image data that has been previously ordered is used as a processing subject and when the image data is stored in the image data server 20 for storing images, as shown in FIG. 27, data including image specifying data (for example, data including the server name, directory name and file name) that specifies the corresponding image data stored in the image data server 20 as a subject image for the print output process instead of the image data itself may be received from the customer as the print order information, and information including the image specifying data, may be transferred to the print output device 30.

Then, prior to an actual print output process, the print output device 30, which has received the above-mentioned print order information, is allowed to access the image data server 20 so as to acquire the image data specified by the image specifying data; thus, it is possible to carry out the print output process for the corresponding image data. Here, the same is true for the second preferred embodiment.

Moreover, the image data related to the ordered prints may be automatically stored in the image data server 20 (120), or the image data is set so as not to be stored in the image data server 20 in the case when no intention for the process is given. In the latter case (that is, in the case when it is not stored in the image data server 20), the image data as a processing subject is only transmitted directly to the print output device 30 (130). and it is not necessary for the image data to be temporarily stored in a place other than the print output device 30, for example, the center server 10

(110) or the image data server 20 (120). Therefore, it is possible to prevent an increase in the load imposed on the server resulting from the image data storage and also to reduce the number of data transfer processes to only once (in the case when the image data is stored in the center server 10 or the image data server 20, the transfer processes of two times are required; thus, it is possible to reduce the load imposed on the network as a whole.

In the case of the above-mentioned respective preferred embodiments, explanations have been given of a case in which the customer owns the corresponding customer identification data, however, the present invention is not intended to be limited by this case. Even when the customer does not have the customer identification data, the print delivery and payment for the bill may be carried out at the delivery shop through a business transaction in cash at the delivery shop. However, since this case makes the identification of the customer unobvious, it is preferable to confirm the identification through the customer identification data as described above, in the case when more stress is put on reliability in the transaction.

Moreover, in the case of the above-mentioned respective preferred embodiments, explanations have been given of a case in which the respective functions of the center server 10 (110) are achieved by executing programs in a computer by using software; however, the present invention is not intended to be limited thereby. For example, one portion of the respective portion may be constituted by using hardware such as an electric circuit.

Moreover, in the case of the above-mentioned respective preferred embodiments, explanations have been given of a case in which the center server 10 (110) is formed by a single computer; however, not limited by this case, it may be formed by a plurality of computers. Here, in this case, data transmitting and receiving processes may be carried out by communications through various networks among the plurality of computers.

Figure 29:
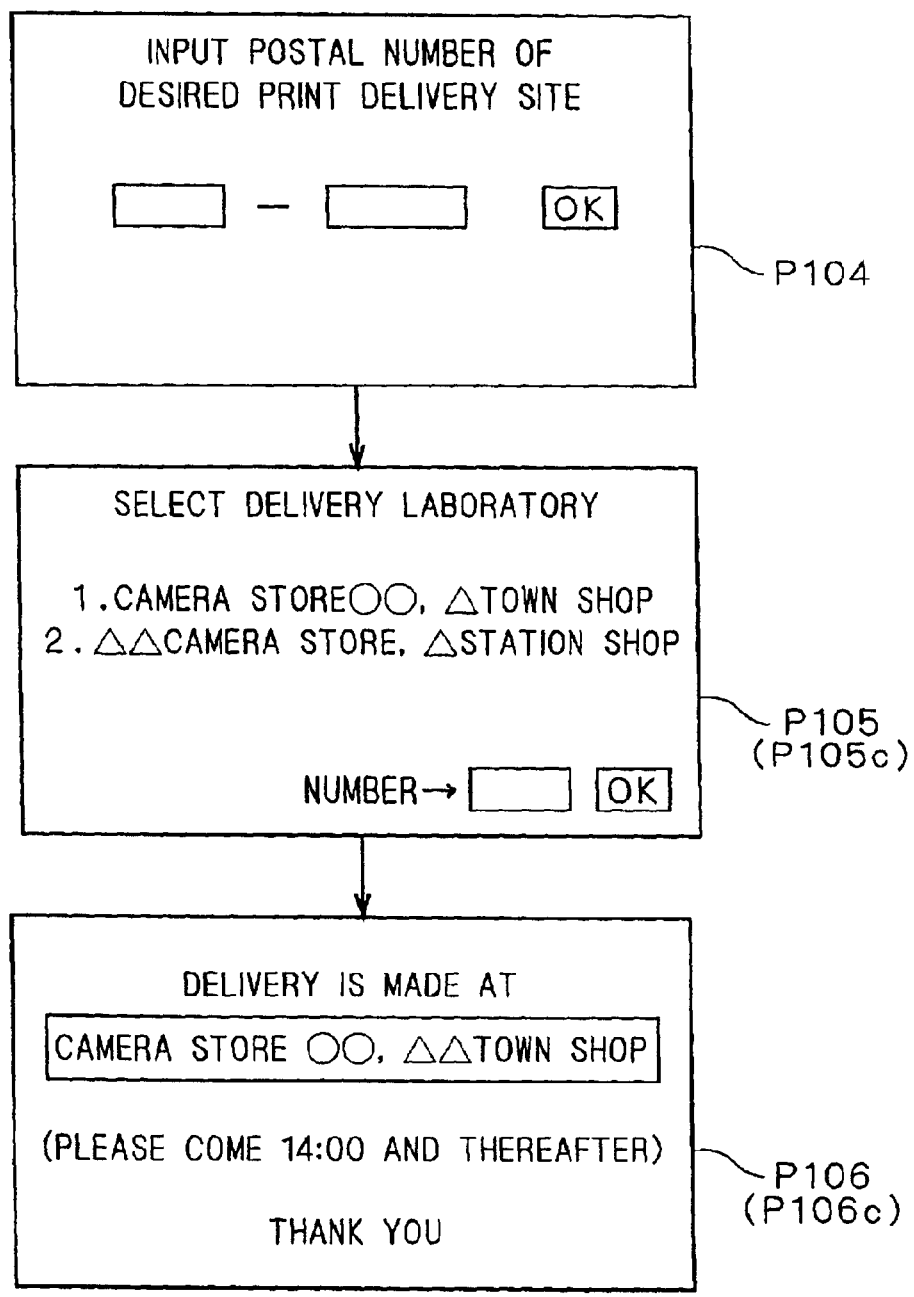
FIG. 29 is a drawing that shows screens P104, P105c and P106c.

The second preferred embodiment exemplifies a case in which the laboratories provided with the second print output devices A2 are non-delivery sites; however, the present invention is not intended to be limited thereby. The laboratories provided with the second print output devices A2 may be also set as delivery sites. In some cases, this arrangement makes it possible to receive the prints earlier since no transporting time is required. For this reason, for example, in step S131b (FIG. 17), screen P110 (FIG. 28) having an increased selection "3. laboratory" may be displayed in place of screen P103 (FIG. 21). When this "3. Laboratory" is selected, a shop provided with the second print output device A2 may be selected as the delivery shop, through the same operations as those in the case when a shop such as a convenience store provided with the first print output device A1 is selected as the delivery shop. FIG. 29 shows screens P104, P105 (P105c), P106 (P106c) displayed on the customer-side terminal 140 related to processes successively carried out after "3. laboratory" has been selected. With respect to these screens, the same input operations, etc. as described above are carried out so that, as shown in screen P106c, it becomes possible to receive the prints at the selected laboratory. In this case, since the above-mentioned transporting process is no longer required, the recipient is informed by the display of the fact that the delivery can be made earlier (in this case, "at 14:00 and thereafter") than the delivery at the convenience store (on the date D, the next day and thereafter in FIG. 23).

Moreover, in the above-mentioned second preferred embodiment, for convenience of explanation, it is assumed that at step S112 (FIG. 15), etc., a plurality of sizes are not selected simultaneously; however, not limited by this case, a plurality of sizes may be selected, and the order may include both of the print outputs of "service size" related to the first printing process and "quarto size" related to the second printing process. Alternatively, with respect to an order for printing a plurality of images, with the first printing process and the second printing process mixedly included (in the case of a plurality of sizes mixedly included), the present invention is also applied thereto.

In this manner, in the case when printing processes of a plurality of kinds are included, the first printing process and the second printing process may be carried out by the corresponding first print output device A1 and the second print output device A2 in a separated manner. Alternatively, in the case when at least one second printing process is included, the print order information may be transmitted to the second print output device A2 capable of executing both of the first printing process and the second printing process placed in a non-delivery shop, etc. In the case of the latter operation, after the ordered prints have been transported from the non-delivery shop to the delivery shop, the customer is allowed to receive the ordered prints at a single delivery shop. In this case, under the judgment that the printing process in the print order information relates to the second printing process, the print order information is transmitted to the second print output device A2.

Moreover, in the above-mentioned second preferred embodiment, factors related to print sizes are used as the predetermined reference for discriminating the first printing process and the second printing process; however, not limited by this case, those factors related to print resolution or the present or absence of a predetermined image processing operation may be used.

For example, the first printing process may be set as a process providing prints having a resolution of not more than a predetermined resolution, and the second printing process may be set as a process providing prints having a resolution exceeding the predetermined resolution. Alternatively, the first printing process may be a printing process not including any of the image-processing operations in an image-processing group consisting of a variable magnification process (enlarging, process and reducing process) and a trimming process for images; and the second printing process may be a printing process including at least one process in the image-processing group consisting of a variable magnification process and a trimming process for images.

While the invention has been shown and described in detail, the foregoing description is in all aspects illustrative and not restrictive. It is therefore understood that numerous other modifications and variations can be devised without departing from the scope of the invention.

What is claimed is:

1. A center server, which is used in a network photo-print service system that takes an order for photo-prints from a customer through the network and provides a print output service in response to the order, comprising:
   a receiver for receiving print order information related to a print order and information related to conditions for a delivery site for prints, outputted in response to said order, from the customer through the network;
   a memory for storing information of a plurality of shops capable of delivering the prints;
   a selector for extracting a delivery-shop candidate group suitable for contents of the printing process of said print order information and said conditions for a delivery site for prints from said plurality of shops capable of delivering said prints based upon the information stored in said memory;

a transmitter for transmitting information related to the delivery-shop candidate group extracted by said selector to the customer; and a controller which, in response to selection by the customer, determines which delivery shop from said delivery-shop candidate group has been selected by the customer, and transmits said print order information to a print output device placed in the delivery shop thus determined.

2. A center server according to claim 1, wherein said print order information comprises image data that is a subject for a print output process, data related to the contents of the print output process and customer identification data for identifying the customer.

3. A center server according to claim 1, wherein said print order information comprises image specifying data for specifying image data stored in a predetermined server as a subject image for a print output process, data related to the contents of the print output process and customer identification data for identifying the customer.

4. A center server according to claim 3, wherein said predetermined server is placed in a separated manner from said center server, and is an image data server for storing image data of the customer.

5. A center server according to claim 1, wherein said information related to conditions for the print delivery site is identification information related to the print delivery site.

6. A center server according to claim 5, wherein said identification information is a postal number.

7. A center server according to claim 5, wherein said identification information is a telephone number.

8. A center server according to claim 1, wherein said print order information includes at least data related to the contents of a printing process, said center server further includes a judging section for judging whether said printing process relates to a first printing process that is outputted by a first print output device or a second printing process that is outputted by a second print output device, and said controller, in the case when the judgment by the judging section shows that the printing process is the first printing process, transmits the print order information to said first print output device, and in the case when the judgment by the judging section shows that the printing process is the second printing process, transmits said print order information to said second print output device.

9. A center server according to claim 8, wherein said first print output device is placed in a delivery shop that the customer is allowed to specify as the print delivery site, and said controller transmits said print order information to the first print output device placed in the delivery shop specified by the customer as the print delivery site.

10. A center server according to claim 8, wherein said second print output device is placed in a non-delivery store that the customer is not allowed to specify as the print delivery site, and said controller transmits said print order information to the second print output device placed in said non-delivery shop.

11. A center server according to claim 8, wherein said first printing process is a process for outputting prints not more than a predetermined size, and said second printing process is a process for outputting prints greater than the predetermined size.

12. A center server according to claim 8, wherein said first printing process is a process for outputting prints having a resolution not higher than a predetermined resolution, and said second printing process is a process for outputting prints having a resolution higher than the predetermined resolution.

13. A center server according to claim 8, wherein said first printing process is a printing process for outputting prints that are not subjected to any of image-processing operations consisting of a variable magnification process and a trimming process for images, and said second printing process is a printing process for outputting prints that are subjected to at least one process of image-processing operations consisting of the variable magnification process and the trimming process for images.

14. A network photo-print service system, which takes an order for photo-prints from a customer through a network and provides a print output service in response to the order, comprising:

a receiver for receiving print order information related to a print order and information related to conditions for a delivery site for prints, outputted in response to the order, from the customer through the network;

a memory for storing information of a plurality of shops capable of delivering the prints;

a selector for extracting a delivery-shop candidate group suitable for contents of the printing process of said print order information and said conditions for a delivery site for prints from the plurality of shops capable of delivering the prints based upon the information stored in said memory;

a transmitter for transmitting information related to the delivery-shop candidate group extracted by said selector to the customer;

a controller which, in response to selection by the customer, determines a delivery shop selected by the customer from said delivery-shop candidate group, and transmits said print order information to a print output device placed in the delivery shop thus determined; and a first print output device, placed in a shop capable of delivering prints, for outputting the prints in response to said print order information.

15. A network photo-print service system according to claim 14, wherein said system comprises a second print output device capable of carrying out a printing process that is different from the printing process of said first print output device.

16. An information processing method, which is used in a center server in a network photo-print service system that takes an order for photo-prints from a customer through the network and provides a print output service in response to the order, comprising the steps of:

receiving print order information related to a print order and information related to conditions for a delivery site for prints, outputted in response to the order, from the customer through the network, extracting a delivery shop candidate group suitable for contents of the printing process of said print order information and said conditions for a delivery site for prints from a plurality of shops capable of delivering the prints based upon information stored in a memory storing information of the plurality of shops capable of delivering the prints;

transmitting information related to said delivery-shop candidate group thus extracted to the customer for selection;

determining a delivery shop from said delivery shop candidate group in response to selection by the customer; and transmitting said print order information to a print output device placed in the delivery shop thus determined.

17. An information processing method according to claim 16, wherein said print order information includes at least data related to the contents of a printing process; and said information processing method further comprising the steps of:

judging whether said printing process relates to a first printing process that is outputted by a first print output device or a second printing process that is outputted by a second print output device; and in the case when the judgment shows that the printing process is the first printing process, transmitting said print order information to said first print output device, and in the case when the judgment shows that the printing process is the second printing process, transmitting said print order information to said second print output device.

18. An information processing method, which is used in a network photo-print service system that takes an order for photo-prints from a customer through a network and provides a print output service in response to the order, comprising the steps of:

receiving print order information related to a print order and information related to conditions for a delivery site for prints, outputted in response to the order, from the customer through the network;

extracting a delivery shop candidate group suitable for contents of the printing process of said print order information and said conditions for a delivery site for prints from a plurality of shops capable of delivering the prints;

transmitting information related to said delivery shop candidate group thus extracted to the customer for selection;

determining a delivery shop from said delivery shop candidate group in response to selection by the customer; and transmitting said print order information to a print output device placed in the delivery shop thus determined.

19. An information processing method according to claim 18, wherein said print order information includes at least data related to the contents of a printing process; and said information processing method further comprising the steps of:

judging whether said printing process relates to a first printing process that is outputted by a first print output device or a second printing process that is outputted by a second print output device; and in the case when the judgment shows that the printing process is the first printing process, transmitting said print order information to said first print output device, and in the case when the judgment shows that the printing process is the second printing process, transmitting said print order information to said second print output device.

* * * * *